US010567202B2

(12) United States Patent
Kishiyama et al.

(10) Patent No.: US 10,567,202 B2
(45) Date of Patent: Feb. 18, 2020

(54) USER EQUIPMENT AND BASE STATION

(71) Applicant: NTT DOCOMO, INC., Tokyo (JP)

(72) Inventors: Yoshihisa Kishiyama, Tokyo (JP); Kiichi Tateishi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/559,643

(22) PCT Filed: Mar. 16, 2016

(86) PCT No.: PCT/JP2016/058312
§ 371 (c)(1),
(2) Date: Sep. 19, 2017

(87) PCT Pub. No.: WO2016/152676
PCT Pub. Date: Sep. 29, 2016

(65) Prior Publication Data
US 2018/0337809 A1    Nov. 22, 2018

(30) Foreign Application Priority Data
Mar. 20, 2015 (JP) ................. 2015-058172

(51) Int. Cl.
*H04L 27/26* (2006.01)
*H04L 5/00* (2006.01)
*H04L 5/14* (2006.01)

(52) U.S. Cl.
CPC ........ *H04L 27/2607* (2013.01); *H04L 5/0007* (2013.01); *H04L 5/0044* (2013.01); *H04L 5/1469* (2013.01)

(58) Field of Classification Search
CPC ............ H04L 27/2607; H04L 27/2646; H04L 27/2602; H04L 5/1469; H04L 5/0007;
(Continued)

(56) References Cited

U.S. PATENT DOCUMENTS 8,582,418 B2* 11/2013 Lee ................. H04L 27/0012
370/204
9,301,159 B1* 3/2016 Marupaduga ......... H04W 24/02
(Continued)

FOREIGN PATENT DOCUMENTS

JP    2009-542121 A    11/2009
JP    2010-539785 A    12/2010
(Continued)

OTHER PUBLICATIONS

Partial Supplementary European Search Report issued in corresponding European Patent Application No. 16768579.1, dated Oct. 26, 2018 (14 pages).
(Continued)

*Primary Examiner* — Jean B Corrielus
(74) *Attorney, Agent, or Firm* — Osha Liang LLP

(57) ABSTRACT

User equipment for communicating with a base station in a radio communication system supporting communication based on a TDD scheme, the user equipment including a transmitter that transmits an uplink signal while setting a guard time in the uplink signal based on a report signal indicating a structure for each subframe, the report signal being transmitted from the base station; a receiver that receives a downlink signal from the base station; and an identification unit that identifies, based on the report signal, a position of a guard time that is set in the downlink signal received by the receiver.

7 Claims, 30 Drawing Sheets

(58) Field of Classification Search
CPC ....... H04L 5/04; H04L 5/0044; H04B 7/2656; H04W 56/0045; H04W 72/04; H04W 28/06; H04J 11/00
See application file for complete search history.

(56) References Cited

U.S. PATENT DOCUMENTS

| | | | |
|---|---|---|---|
| 2007/0159957 A1* | 7/2007 | Ljung | H04L 27/2607 370/208 |
| 2007/0297379 A1 | 12/2007 | Gorokhov et al. | |
| 2009/0073902 A1* | 3/2009 | Astely | H04B 7/2656 370/280 |
| 2010/0278080 A1 | 11/2010 | Pan et al. | |
| 2010/0310022 A1* | 12/2010 | Asjadi | H04L 27/2605 375/343 |
| 2011/0250897 A1 | 10/2011 | Seo et al. | |
| 2015/0295743 A1* | 10/2015 | Hwang | H04W 48/12 370/280 |
| 2016/0119453 A1* | 4/2016 | Tian | H04L 5/04 370/338 |
| 2016/0227436 A1* | 8/2016 | Vermani | H04W 28/06 |

FOREIGN PATENT DOCUMENTS

| | | |
|---|---|---|
| JP | 2011-501920 A | 1/2011 |
| JP | 2014-236369 A | 12/2014 |

OTHER PUBLICATIONS

International Search Report of the International Searching Authority issued in PCT/JP2016/058312 dated May 17, 2016 (4 pages).
Written Opinion of the International Searching Authority issued in PCT/JP2016/058312 dated May 17, 2016 (5 pages).
Extended European Search Report issued in corresponding European Patent Application No. 16768579.1, dated Feb. 1, 2019 (12 pages).
Office Action in counterpart Chinese Patent Application No. 201680016658.9 dated Nov. 12, 2019 (11 pages).
Office Action in counterpart Japanese Patent Application No. 2017-508268 dated Nov. 12, 2019 (5 pages).

* cited by examiner

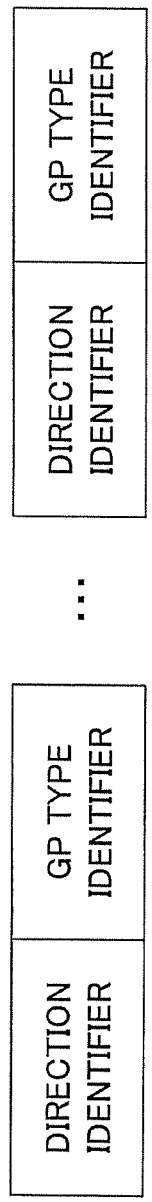

FIG.24

| RB TYPE IDENTIFIER | GC PRESENCE/ ABSENCE IDENTIFIER | GC TYPE IDENTIFIER |

...

| RB TYPE IDENTIFIER | GC PRESENCE/ ABSENCE IDENTIFIER | GC TYPE IDENTIFIER |

USER EQUIPMENT AND BASE STATION

CROSS-REFERENCE TO RELATED APPLICATIONS

This is a U.S. national stage application of International Application No. PCT/JP2016/058312 filed Mar. 16, 2016, which claims priority to Japanese Patent Application No. 2015-058172 filed Mar. 20, 2015, both of which are incorporated herein by reference in their entirety.

TECHNICAL FIELD

The present invention relates to user equipment and a base station.

BACKGROUND ART

As a duplex communication method in LTE (Long Term Evolution)/LTE-Advanced, TDD (Time Division Duplexing) has been known such that subframes used for uplink and subframes used for downlink within a radio frame are switched in accordance with a predetermined configuration ratio.

The ratio of the uplink and the downlink in the radio frame is determined in advance by operation, etc., by an operator depending on uplink and downlink traffic amounts, and it is reported to user equipment by system information.

Furthermore, in LTE/LTE-Advanced, in order to synchronize uplink signals transmitted from a plurality of units of the user equipment at a base station, timing advance control (TA control) has been introduced. The TA control is a scheme such that, the base station estimates a propagation delay of a signal transmitted from the user equipment, and assigns transmission timing of an uplink signal to the user equipment, so that the uplink signals transmitted from the plurality of units of the user equipment are synchronized.

Furthermore, in the TDD scheme, it is required to prevent an uplink signal and a downlink signal from being simultaneously transmitted at a certain time. For this reason, a non-transmission interval is established in consideration of the propagation delay between the user equipment and the base station, and the adjustment of the transmission timing of the uplink signal by the TA control. This non-transmission interval is referred to as a guard period (GP: Guard Period).

PRIOR ART DOCUMENT

[Patent Document]
Patent Document 1: Japanese Unexamined Patent Publication No. 2014-236369

SUMMARY OF INVENTION

Problem to be Solved by the Invention

In the TDD scheme, uplink and downlink subframes are determined by the predetermined configuration ratio. Thus, a dynamic TDD scheme has been studied such that the TDD scheme is extended and the configuration ratio between the uplink and downlink subframes is dynamically changed depending on a traffic amount.

Furthermore, in the communication scheme called the fifth generation which is an evolution of LTE/LTE-Advanced, an OFDM (Orthogonal Frequency-Division Multiplexing) scheme has been studied such that a band for performing the TA control and a band for not performing the TA control coexist within the same system band.

Furthermore, in the fifth-generation wireless technology which is the evolution of LTE/LTE-Advanced, a full-duplex communication scheme has been studied that allows simultaneous transmission and reception of an uplink signal and a downlink signal in the same bandwidth. In this communication scheme, it has been studied to enhance communication quality of a control signal by reducing interference that can occur between a subcarrier to which an uplink control signal is to be mapped and a subcarrier to which a downlink control signal is to be mapped by providing a non-communication subcarrier (which is referred to as a "guard subcarrier," hereinafter) between the uplink control signal and a downlink control signal.

Thus, in the future radio technology, it can be considered to variously combine adoption of dynamic TDD, an OFDM scheme in which a band for performing the TA control and a band for not performing the TA control are mixed, a communication scheme based on the full duplex, and so forth, so that it can be assumed that the above-described guard time or the guard subcarrier is dynamically controlled by various schemes.

However, in the usual LTE/LTE-advanced, there is no technique for dynamically controlling the guard time. Furthermore, in the usual LTE/LTE-Advanced, there is no technique for allowing setting of a guard subcarrier.

The disclosed technique is developed in view of the above, and an object is to provide a technique for dynamically controlling a guard time or a technique for allowing setting of a guard subcarrier.

Means for Solving the Problem

According to the disclosed technology, there is provided user equipment for communicating with a base station in a radio communication system that supports communication based on a TDD scheme, the user equipment including a transmitter that transmits an uplink signal while setting a guard time to the uplink signal based on a report signal indicating a structure for each subframe, the report signal being transmitted from the base station; a receiver that receives a downlink signal from the base station; and an identification unit that identifies, based on the report signal, a position of a guard time that is set in the downlink signal received by the receiver.

Furthermore, according to the disclosed technology, there is provided a base station for communicating with user equipment in a radio communication system that supports communication based on a TDD scheme, the base station including a generator that generates a report signal indicating a structure for each subframe; a report unit that reports the structure for each subframe by transmitting the report signal to the user equipment; a transmitter that transmits a downlink signal while setting a guard time in the downlink signal based on the report signal; a receiver that receives an uplink signal from the user equipment; and an identification unit that identifies a position of a guard time that is set in the uplink signal received by the receiver based on the structure for each subframe.

Furthermore, according to the disclosed technology, there is provided user equipment for communicating with a base station in a radio communication system that supports communication based on a full duplex scheme, the user equipment including a receiver that receives a report signal indicating a structure for each resource block in a predetermined subframe, the report signal being transmitted from the base station; and an identification unit that identifies, based on the report signal, whether each resource block is a resource block to be allocated to an uplink control signal or a resource block to be allocated to a downlink control signal, and identifies a position of a guard subcarrier included in each resource block, wherein, in the resource block allocated to the downlink control signal, the resource block being identified by the identification unit, the receiver receives data included in a subcarrier other than the guard subcarrier.

Furthermore, according to the disclosed technology, there is provided a base station for communicating with user equipment in a radio communication system that supports communication based on a full duplex scheme, the base station including a generator that generates a report signal indicating a structure for each resource block in a predetermined subframe; a first transmitter that transmits the report signal to the user equipment; and a second transmitter that transmits data while setting a guard subcarrier in a resource block allocated to a downlink control signal, based on the structure for each resource block.

Advantage of the Invention

According to the disclosed technology, there is provided the technique for dynamically controlling the guard time or the technique for allowing setting of a guard subcarrier.

BRIEF DESCRIPTION OF DRAWINGS

FIG. 19B is a diagram for illustrating the scheme for dynamically controlling the subframe configuration;

FIG. 24 is a diagram illustrating an example of a signal format of a resource block configuration report signal;

EMBODIMENTS OF THE INVENTION

Figure 1:
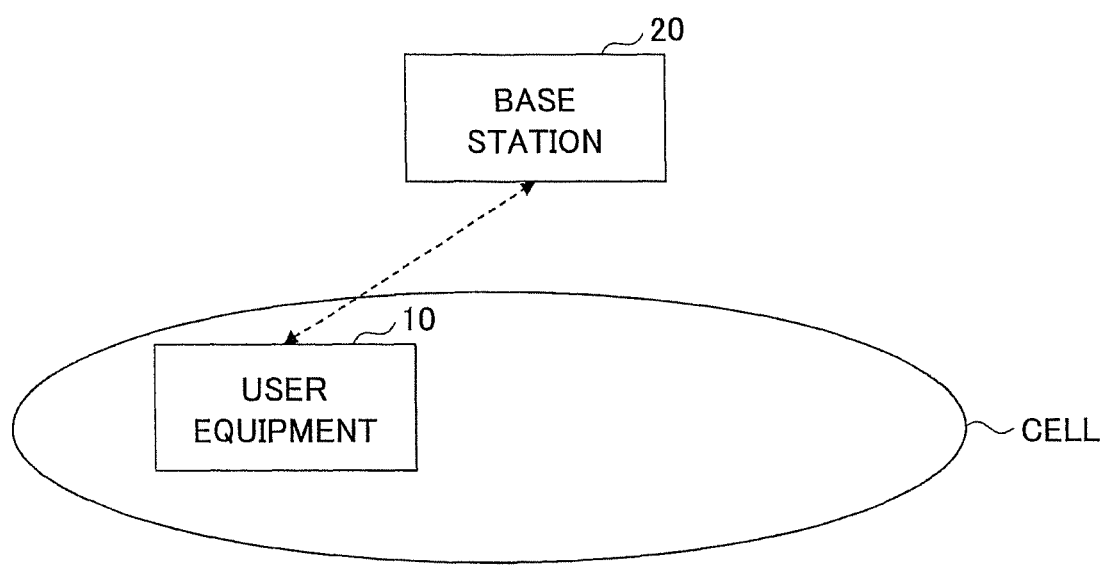
FIG. 1 is a diagram illustrating a configuration of a radio communication system according to a first embodiment.

Embodiments of the present invention are described below by referring to the drawings. Note that the embodiments described below are merely examples, and embodiments to which the present invention is to be applied are not limited to the following embodiments. For example, as a radio communication system according to the embodiments, a system that is based on a scheme conforming to LTE is assumed; however, the present invention is not limited to LTE, and can be applied to another scheme. Note that, in the present specification and the scope of the claims, "LTE" is used in a broad sense including, not only a communication scheme corresponding to release 8 or 9 of the 3GPP, but also a communication scheme corresponding to release 10, 11, 12, 13, or on or after release 14 of the 3GPP.

Note that the radio communication system according to the first embodiment is described by assuming that communication is performed by dynamically switching an uplink and downlink by dynamic TDD, and that an OFDM scheme is used such that, in a same band width, a band for performing TA control and a band for not performing the TA control are mixed; however, it is not limited to this. It can be applied to various communication schemes, such as a communication scheme merely using an OFDM scheme in which the TA control is not to be performed.

Furthermore, a radio communication system according to the second embodiment is described by assuming that a communication scheme is used that is based on full duplex such that, in the same band width, an uplink signal and a downlink signal can be simultaneously transmitted and received; however, it is not limited to this.

Furthermore, in the embodiment of the present invention, the first embodiment and the second embodiment can be combined.

First Embodiment

<Overview>

FIG. 1 is a diagram illustrating a configuration of a radio communication system according to the first embodiment. As illustrated in FIG. 1, the radio communication system according to the embodiment includes user equipment 10 and a base station 20. Furthermore, in the example of FIG. 1, one cell is illustrated; however, it is for convenience of depiction, and a plurality of cells may exist. Furthermore, for example, it may be configured such that, RRE (remote radio equipment) that is connected to the base station 20 through an optical fiber, etc., is installed at a location that is separated from the base station 20.

The user equipment 10 is provided with a function for executing communication with the base station 20 and a core network, etc., through radio. The user equipment 10 is, for example, a mobile phone, a smartphone, a tablet, a mobile router, a wearable terminal, and so forth. The user equipment 10 may be any user equipment 10, as long as it includes a communication function. The user equipment 10 is formed of a CPU, such as a processor; a memory device, such as a ROM, a RAM, or a flash memory; and a hardware resource, such as an antenna, a RF (Radio Frequency) device, and so forth for communicating with the base station 20. Each of functions and processes of the user equipment 10 may be implemented by processing or executing, by the processor, data and a program stored in the memory device. However, the user equipment 10 is not limited to the above-described hardware configuration, and may include any other suitable hardware configuration.

The base station 20 performs communication with the user equipment 10 through radio. The base station 20 is formed of a CPU, such as a processor; a memory device, such as a ROM, a RAM, or a flash memory; a hardware resource, such as an antenna for communicating with the user equipment 10, etc.; and a communication interface for communicating with an adjacent base station 20, a core network, and so forth. Each of functions and processes of the base station 20 may be implemented by processing or executing, by the processor, data and a program stored in the memory device. However, the base station 20 is not limited to the above-described hardware configuration, and may include any other suitable hardware configuration.

Here, the radio communication system in the embodiment performs communication by dynamically switching an uplink and a downlink by dynamic TDD; and, at the same time, uses an OFDM scheme such that, in the same band width, a band for performing TA control and a band for not performing the TA control are mixed.

Figure 2:
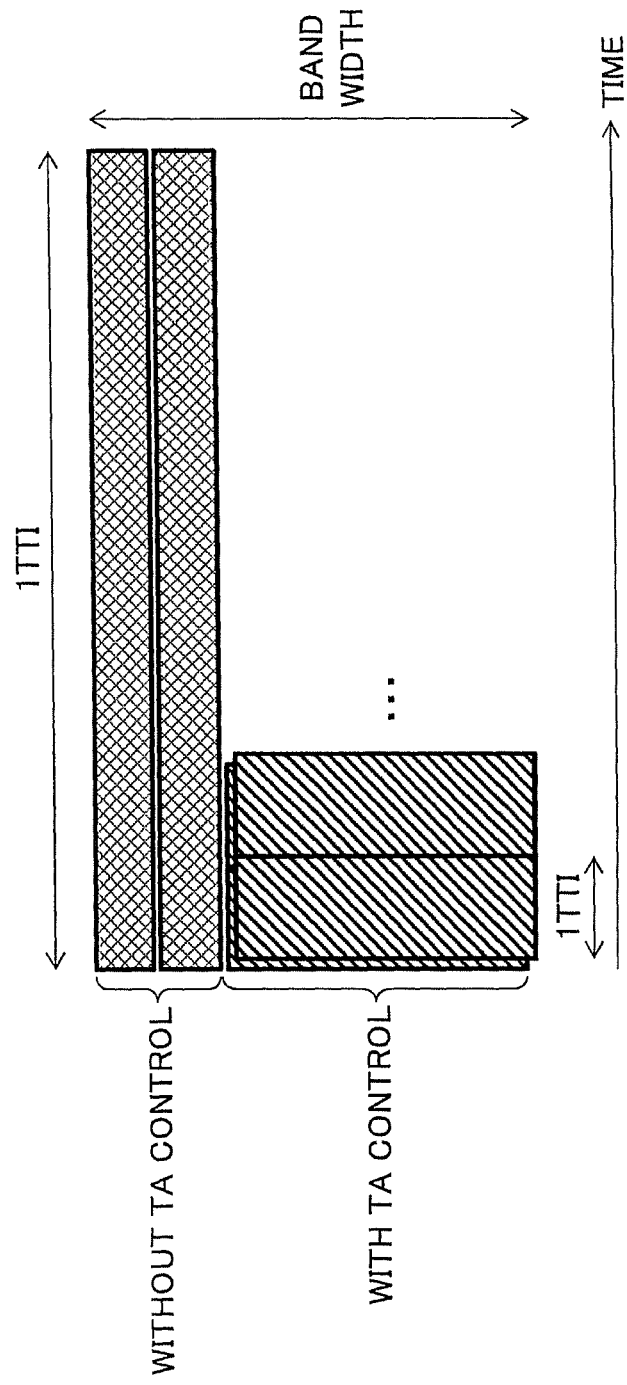
FIG. 2 is a diagram illustrating an overview of an OFDM scheme in which a band for performing TA control and a band for not performing the TA control are mixed.

FIG. 2 is a diagram illustrating an overview of the OFDM scheme such that the band for performing the TA control and the band for not performing the TA control are mixed. As illustrated in FIG. 2, the frequency band for not performing the TA control and the frequency band for performing the TA control are included in a predetermined band width. It is assumed that the frequency band for not performing the TA control is used for relatively low rate communication by extending the TTI (Transmission Time Interval) length; and that the frequency band for performing the TA control is used for high rate communication by shortening the TTI length.

In the usual TDD scheme, a guard time is provided within a subframe so as to avoid simultaneously performing uplink transmission and downlink transmission in the same frequency. This guard time is designed by considering a propagation delay time in consideration of a cell radius and a transmission timing that is changed by the TA control. In the usual TDD scheme, subframes allocated to an uplink signal and subframes allocated to a downlink signal are fixed in advance. Furthermore, the guard time is included in a special subframe.

In the dynamic TDD, subframes allocated to an uplink signal and a subframe allocated to a downlink signal are dynamically changed, so that various schemes can be considered as a method of setting the guard time within the subframe. Furthermore, when the TA control is not performed, the user equipment 10 transmits an uplink signal at a timing adjusted to a timing of receiving the downlink signal, so that various schemes can be considered as a method of setting the guard time within the subframe.

<Processing Method>

In the following, a plurality of methods of setting the guard time is described for a case where the TA control is performed and a case where the TA control is not performed.

(Method of Setting the Guard Time)

Figure 3:
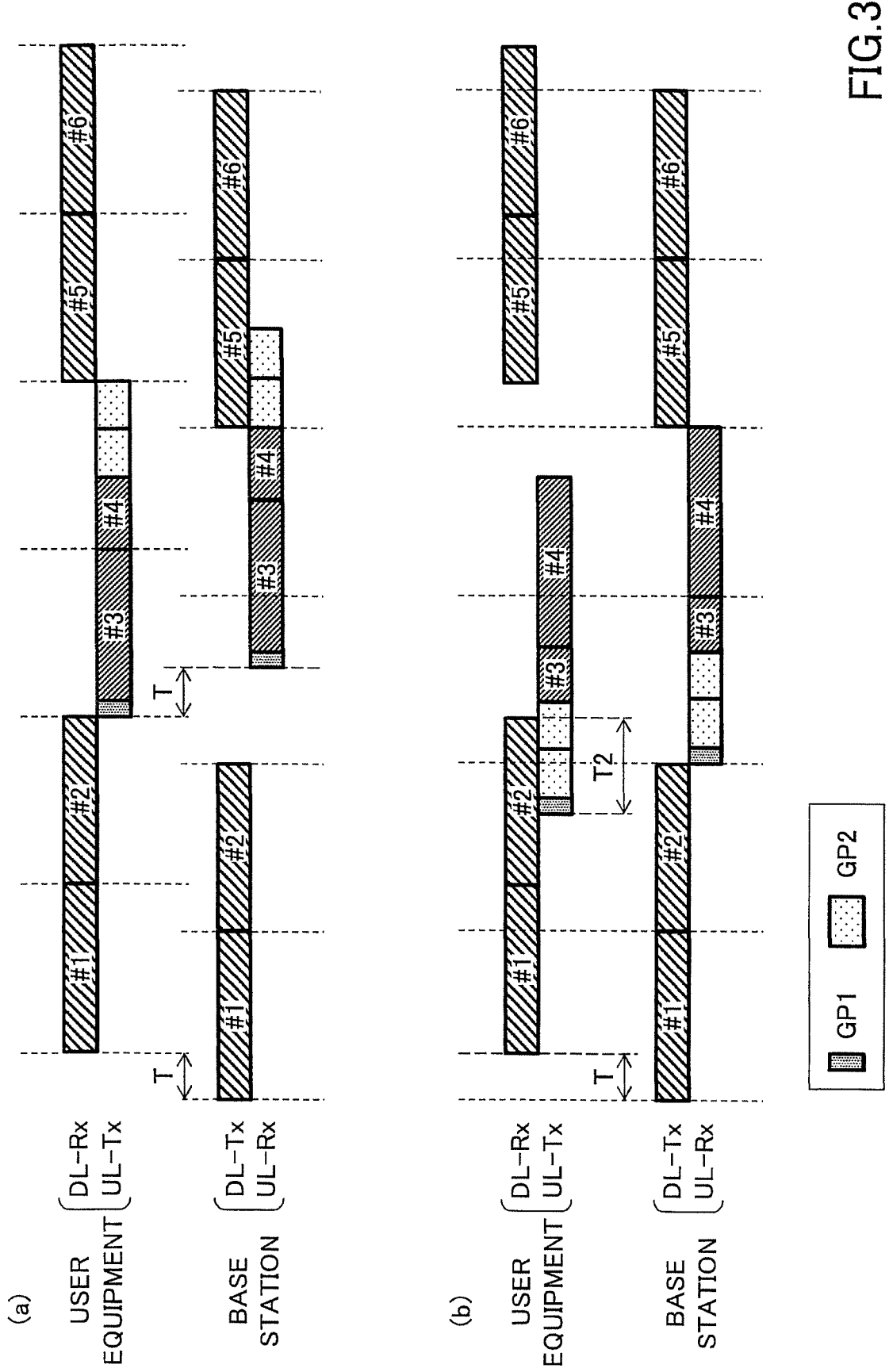
FIG. 3 is a diagram for illustrating a method of setting a guard time (version 1)

FIG. 3 is a diagram for illustrating a method of setting the guard time (version 1). In FIG. 3, (a) is an example of the method of setting the guard time when the TA control is not performed. In FIG. 3, (b) is an example of the method of setting the guard time when the TA control is performed.

In FIG. 3, the "DL (Downlink)-Rx" means a downlink signal received by the user equipment 10. The "UL (Uplink)-Tx" means an uplink signal transmitted from the user equipment 10. The "DL-Tx" means a downlink signal transmitted from the base station 20. The "UL-Rx" means an uplink signal received by the base station 20. Namely, the "DL-Tx" and the "DL-Rx" are mutually paired; and, similarly, the "UL-Tx" and the "UL-Rx" are mutually paired. Furthermore, the "GP1 (Guard Period 1)" represents a guard time for providing a time required for switching transmission and reception in the user equipment 10; and the "GP2 (Guard Period 2)" represents a guard time for considering a maximum propagation delay in the cell radius (a propagation delay between the user equipment 10 located at a cell edge and the base station 20). Namely, the length (time) of the GP1 is the same as the time required for switching transmission and reception in the user equipment 10; and the length (time) of the GP2 is the same as the maximum propagation delay time in the cell radius of the cell that is established in the radio communication system. Note that the length (time) of the GP2 is determined for each cell radius of the cell. Namely, the length (time) of the GP2 differs for each cell size.

Furthermore, "T" represents the maximum propagation delay time in the cell radius of the cell that is established in the radio communication system. Namely, it can also be said that FIG. 3 represents a situation where each subframe (#1 through #6) is propagated between the user equipment 10 and the base station 20 for the case where the propagation delay time is maximum. Furthermore, the "T2" represents the time assigned by the base station 20 in accordance with the TA control (time to advance the schedule of transmission). In the TA control, the base station 20 communicates to the user equipment 10 to what extent the timing for transmitting the uplink subframe is to be advanced with respect to the timing of receiving the downlink subframe. In the embodiment, the method of the TA control is the same as the method of the TA control in usual LTE, so that the detailed description is omitted; however, since FIG. 3 depicts the case where the propagation delay time is maximum, for the case of FIG. 3, T2 is substantially twice the time T.

First, (a) of FIG. 3 is described. In the example of (a) of FIG. 3, it is assumed that the user equipment 10 starts transmitting an uplink subframe at a timing of receiving a downlink subframe transmitted from the base station 20.

If a subframe subsequent to a downlink subframe is an uplink subframe, the user equipment 10 adds one GP1 to the start of the uplink subframe subsequent to the downlink subframe. In the example of (a) of FIG. 3, one GP1 is added to the start of the uplink subframe #3. Furthermore, if a subframe subsequent to an uplink subframe is a downlink subframe, the user equipment 10 adds two GP2s to the end of the uplink subframe. In the example of (a) of FIG. 3, two GP2s are added to the end of the uplink subframe #4.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (a) of FIG. 3), the interference between the uplink communication and the downlink communication is prevented.

Next, (b) of FIG. 3 is described. In the example of (b) of FIG. 3, it is assumed that the user equipment 10 starts transmitting the uplink subframe at a timing that is advanced by the time T2 from the timing of receiving the downlink subframe in accordance with the TA control from the base station 20.

If a subframe subsequent to a downlink subframe is an uplink subframe, the user equipment 10 adds one GP1 and two GP2s to the start of the uplink subframe subsequent to the downlink subframe. In the example of (b) of FIG. 3, one GP1 and two GP2s are added to the start of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of (b) of FIG. 3) does not overlap an interval of the downlink subframe #5 including data (the whole interval in the example of (b) of FIG. 3), the interference between the uplink communication and the downlink communication is prevented.

Figure 4:
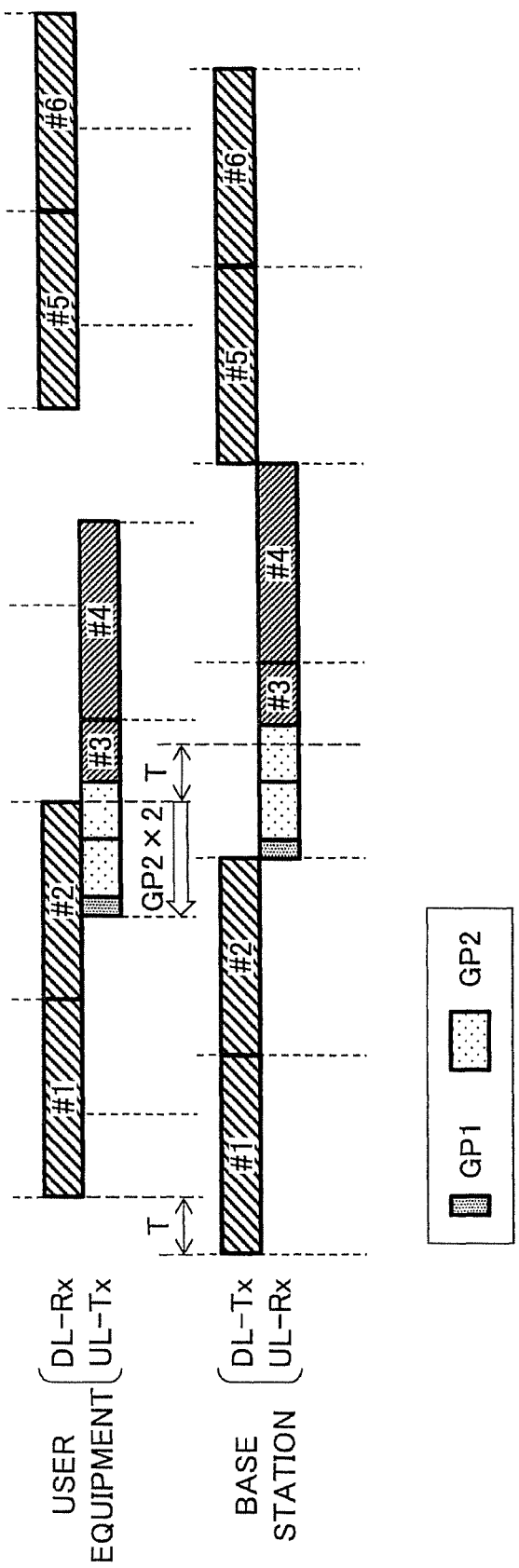
FIG. 4 is a diagram for illustrating the method of setting the guard time (version 2)

FIG. 4 is a diagram for illustrating the method of setting the guard time (version 2). FIG. 4 is an example of a method of setting the guard time for a case where the TA control is not performed. The points that are not particularly referred to are the same as those of FIG. 3.

In the example of FIG. 4, it is assumed that the user equipment 10 starts transmitting the uplink subframe at a timing that is advanced by twice the time of GP2 from the timing of receiving the downlink subframe transmitted from the base station 20.

If a subframe subsequent to a downlink subframe is an uplink subframe, the user equipment 10 adds one GP1 and two GP2s to the start of the uplink subframe subsequent to the downlink subframe. In the example of FIG. 4, one GP1 and two GP2s are added to the stat of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of FIG. 4) does not overlap an interval of the downlink subframe #5 including data (the whole interval in the example of FIG. 4), the interference between the uplink communication and the downlink communication is prevented.

Note that the guard time in the example of FIG. 4 is the same as that of (b) of FIG. 3. Namely, in the method of adding the guard time of FIG. 4, the frame configurations can be made common between the cases where the TA control is performed and the TA control is not performed.

Figure 5:
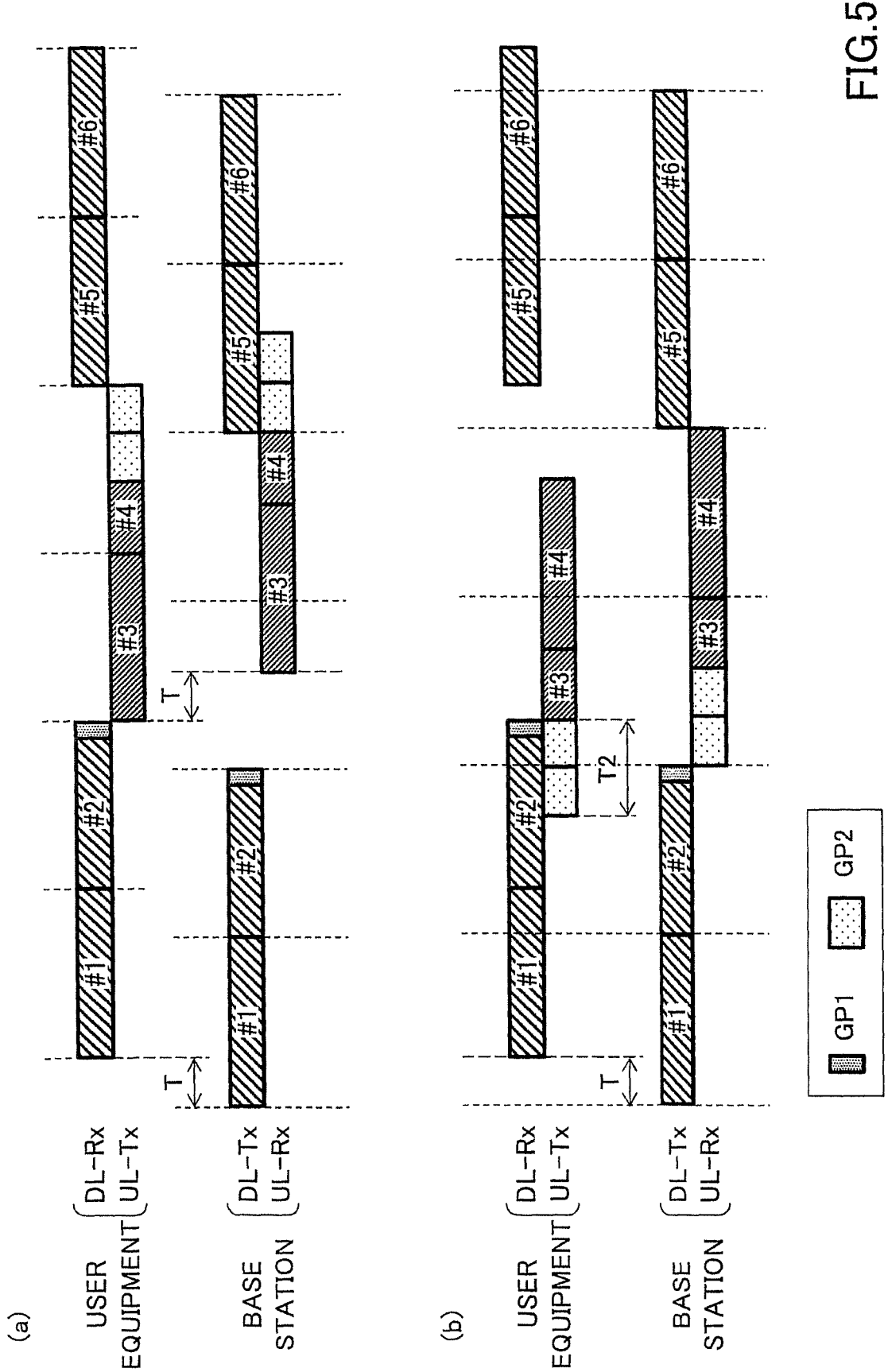
FIG. 5 is a diagram for illustrating the method of setting the guard time (version 3)

FIG. 5 is a diagram for illustrating the method of setting the guard time (version 3). In FIG. 5, (a) is an example of a method of setting the guard time for a case where the TA control is not performed. In FIG. 5, (b) is an example of a method of setting the guard time for a case where the TA control is performed. The points that are not particularly referred to are the same as those of FIG. 3.

First, (a) of FIG. 5 is described. In the example of (a) of FIG. 5, it is assumed that the user equipment 10 starts transmitting the uplink subframe at the timing of receiving the downlink subframe transmitted from the base station 20.

If a subframe subsequent to a downlink subframe is an uplink subframe, the base station 20 adds one GP1 to the end of the downlink subframe. In the example of (a) of FIG. 5, one GP1 is added to the end of the downlink subframe #2. Furthermore, if a subframe subsequent to an uplink subframe is a downlink subframe, the user equipment 10 adds two GP2s to the end of the uplink subframe. In the example of (a) of FIG. 5, two GP2s are added to the end of the uplink subframe #4.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (a) of FIG. 5), the interference between the uplink communication and the downlink communication is prevented.

Next, (b) of FIG. 5 is described. In the example of (b) of FIG. 5, it is assumed that the user equipment 10 starts transmitting the uplink subframe at a timing that is advanced by the time T2 from the timing of receiving the downlink subframe in accordance with the TA control from the base station 20.

If a subframe subsequent to a downlink subframe is an uplink subframe, the base station 20 adds one GP1 to the end of the downlink subframe. In the example of (b) of FIG. 5, one GP1 is added to the end of the downlink subframe #2. Furthermore, if a subframe subsequent to a downlink subframe is an uplink subframe, the user equipment 10 adds two GP2s to the start of the uplink subframe. In the example of (b) of FIG. 5, two GP2s are added to the start of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of (b) of FIG. 5) does not overlap an interval of the downlink subframe #5 including data (the whole interval in the example of (b) of FIG. 5), the interference between the uplink communication and the downlink communication is prevented.

Figure 6:
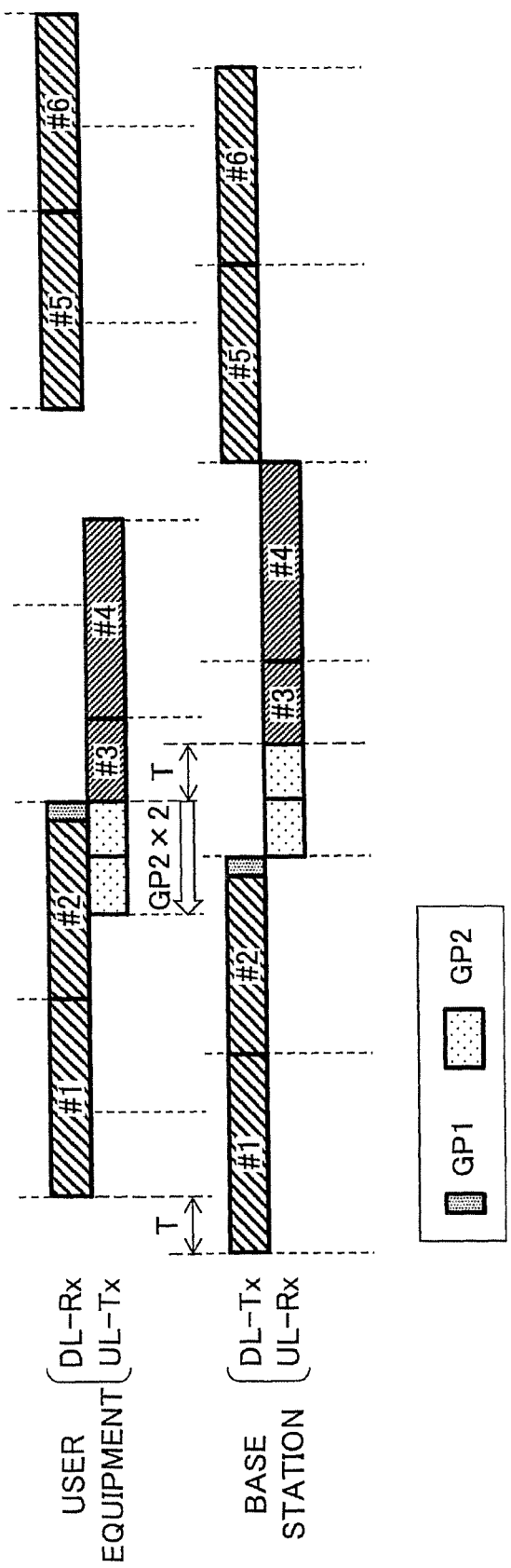
FIG. 6 is a diagram for illustrating the method of setting the guard time (version 4)

FIG. 6 is a diagram for illustrating the method of setting the guard time (version 4). FIG. 6 is an example of a method of setting the guard time for a case where the TA control is not performed. The points that are not particularly referred to are the same as those of FIG. 3.

In the example of FIG. 6, it is assumed that the user equipment 10 starts transmitting the uplink subframe at a timing that is advanced by twice the time T2 from the timing of receiving the downlink subframe transmitted from the base station 20.

If a subframe subsequent to a downlink subframe is an uplink subframe, the base station 20 adds one GP1 to the end of the downlink subframe. In the example of FIG. 6, one GP1 is added to the end of the downlink subframe #2. Furthermore, if a subframe subsequent to a downlink subframe is an uplink subframe, the user equipment 10 adds two GP2s to the start of the uplink subframe. In the example of FIG. 6, two GP2s are added to the start of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of FIG. 6) does not overlap an interval of the downlink subframe #5 including data (the whole interval in the example of FIG. 6), the interference between the uplink communication and the downlink communication is prevented.

Note that the guard time in the example of FIG. 6 is the same as that of (b) of FIG. 5. Namely, in the method of adding the guard time of FIG. 6, the frame configurations can be made common between the cases where the TA control is performed and the TA control is not performed.

Figure 7:
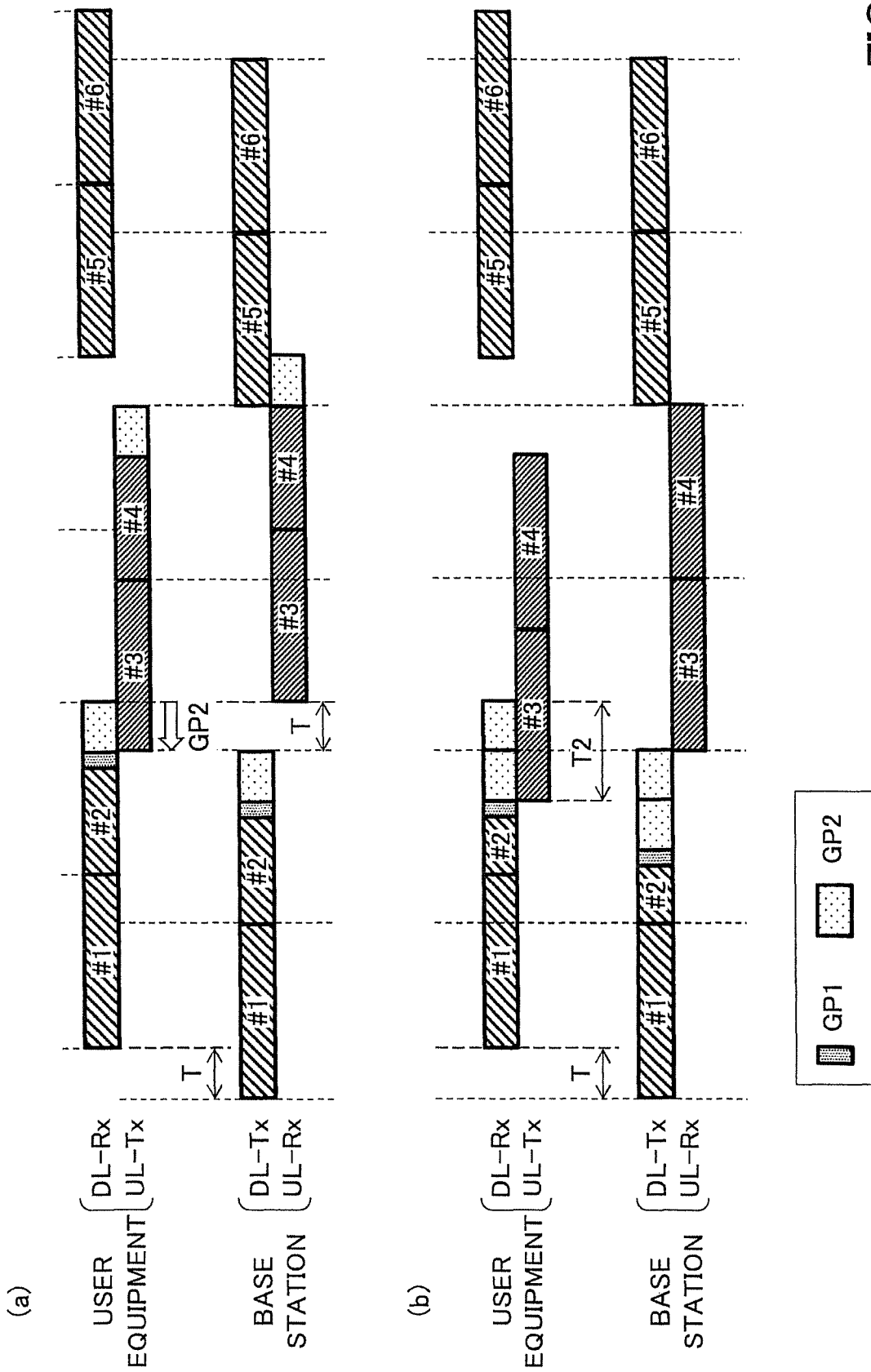
FIG. 7 is a diagram for illustrating the method of setting the guard time (version 5)

FIG. 7 is a diagram for illustrating the method of setting the guard time (version 5). In FIG. 7, (a) is an example of a method of setting the guard time for a case where the TA control is not performed. In FIG. 7, (b) is an example of a method of setting the guard time for a case where the TA control is performed. The points that are not particularly referred to are the same as those of FIG. 3.

First, (a) of FIG. 7 is described. In the example of (a) of FIG. 7, it is assumed that the user equipment 10 starts transmitting the uplink subframe at a timing that is advanced by the time GP2 from the timing of receiving the downlink subframe transmitted from the base station 20.

If a subframe subsequent to a downlink subframe is an uplink subframe, the base station 20 adds one GP1 and one GP2 to the end of the downlink subframe. In the example of (a) of FIG. 7, one GP1 and one GP2 are added to the end of the downlink subframe #2. Furthermore, if a subframe subsequent to an uplink subframe is a downlink subframe, the user equipment 10 adds one GP2 to the end of the uplink subframe. In the example of (a) of FIG. 7, one GP2 is added to the end of the uplink subframe #4.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2 from the subframe #4) does not overlap an interval of the downlink subframe #5 including data (the whole interval in the example of (a) of FIG. 7), the interference between the uplink communication and the downlink communication is prevented.

Next, (b) of FIG. 7 is described. In the example of (b) of FIG. 7, it is assumed that the user equipment 10 starts transmitting the uplink subframe at a timing that is advanced by the time T2 from the timing of receiving the downlink subframe in accordance with the TA control from the base station 20.

If a subframe subsequent to a downlink subframe is an uplink subframe, the base station 20 adds one GP1 and two GP2s to the end of the downlink subframe. In the example of (b) of FIG. 7, one GP1 and two GP2s are added to the end of the downlink subframe #2.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of (b) of FIG. 7) does not overlap an interval of the downlink subframe #5 including data (the whole interval in the example of (b) of FIG. 7), the interference between the uplink communication and the downlink communication is prevented.

Figure 8:
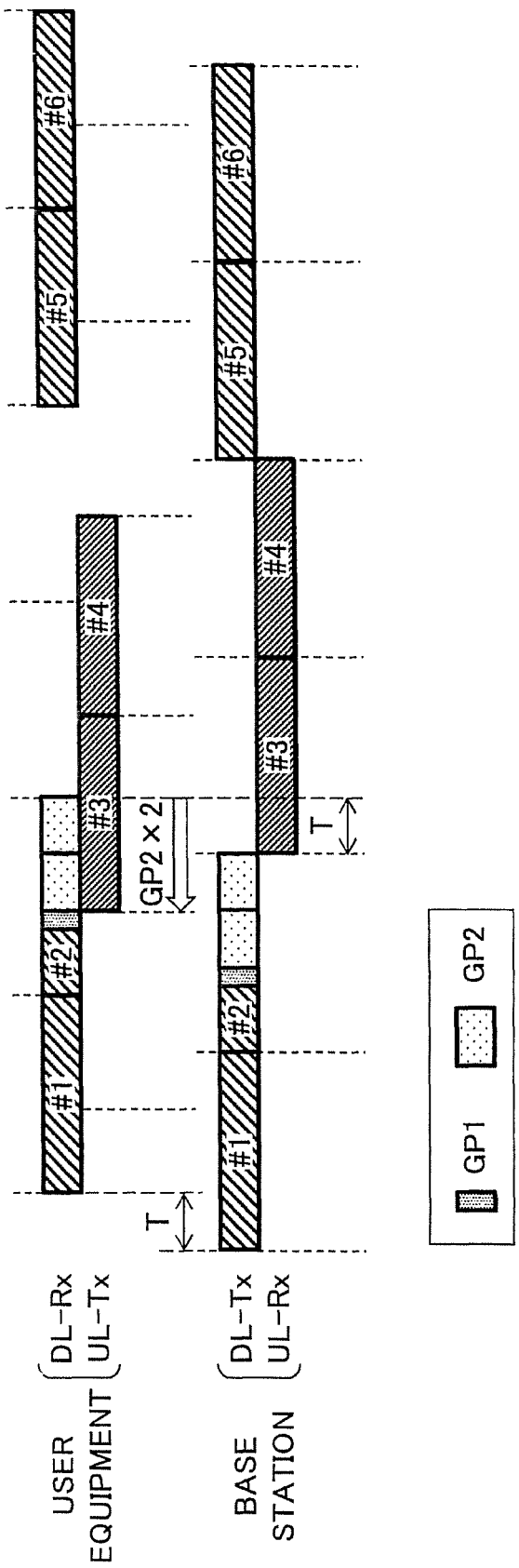
FIG. 8 is a diagram for illustrating the method of setting the guard time (version 6)

FIG. 8 is a diagram for illustrating the method of setting the guard time (version 6). FIG. 8 is an example of a method of setting the guard time for a case where the TA control is not performed. The points that are not particularly referred to are the same as those of FIG. 3.

In the example of FIG. 8, it is assumed that the user equipment 10 starts transmitting the uplink subframe at a timing that is advanced by twice the time GP2 from the timing of receiving the downlink subframe transmitted from the base station 20.

If a subframe subsequent to a downlink subframe is an uplink subframe, the base station 20 adds one GP1 and two GP2s to the end of the downlink subframe. In the example of FIG. 8, one GP1 and two GP2s are added to the end of the downlink subframe #2.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of FIG. 8) does not overlap an interval of the downlink subframe #5 including data (the whole interval in the example of FIG. 8), the interference between the uplink communication and the downlink communication is prevented.

Note that the guard time in the example of FIG. 8 is the same as that of (b) of FIG. 7. Namely, in the method of adding the guard time of FIG. 8, the frame configurations can be made common between the cases where the TA control is performed and the TA control is not performed.

Figure 9:
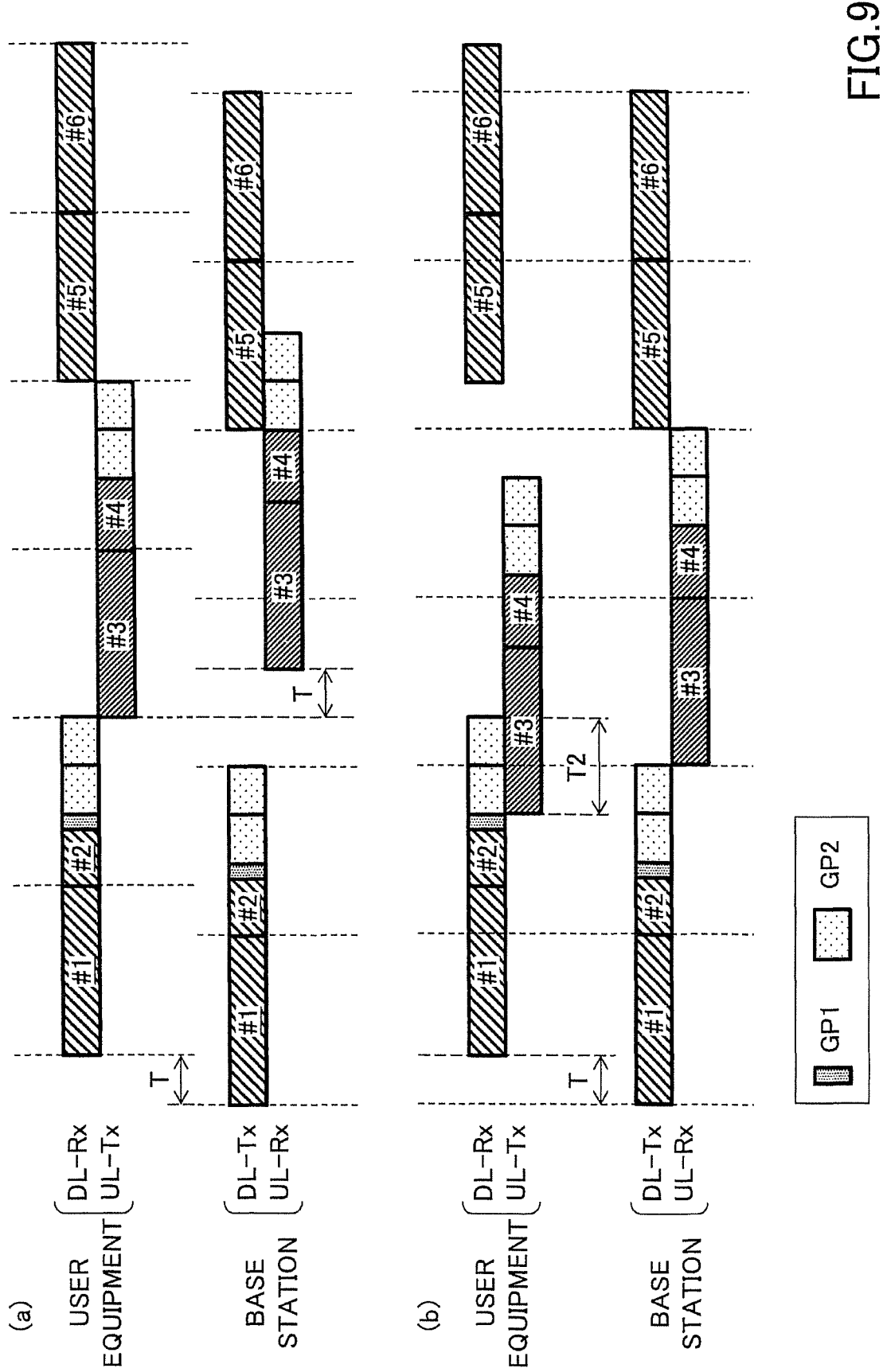
FIG. 9 is a diagram for illustrating the method of setting the guard time (version 7)

FIG. 9 is a diagram for illustrating the method of setting the guard time (version 7). In FIG. 9, (a) is an example of a method of setting the guard time for a case where the TA control is not performed. In FIG. 9, (b) is an example of a method of setting the guard time for a case where the TA control is performed. The points that are not particularly referred to are the same as those of FIG. 3.

First, (a) of FIG. 9 is described. In the example of (a) of FIG. 9, it is assumed that the user equipment 10 starts transmitting the uplink subframe at the timing of receiving the downlink subframe transmitted from the base station 20.

If a subframe subsequent to a downlink subframe is an uplink subframe, the base station 20 adds one GP1 and two GP2s to the end of the downlink subframe. In the example of (a) of FIG. 9, one GP1 and two GP2s are added to the end of the downlink subframe #2. Furthermore, if a subframe subsequent to an uplink subframe is a downlink subframe, the user equipment 10 adds two GP2s to the end of the uplink subframe. In the example of (a) of FIG. 9, two GP2s are added to the end of the uplink subframe #4.

Consequently, at the moment at which the downlink subframe #2 is switched to the uplink subframe #3, the guard time with the length greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (a) of FIG. 9), the interference between the uplink communication and the downlink communication is prevented.

Next, (b) of FIG. 9 is described. In the example of (b) of FIG. 9, it is assumed that the user equipment 10 starts transmitting the uplink subframe at a timing that is advanced by the time T2 from the timing of receiving the downlink subframe in accordance with the TA control from the base station 20. Since the subframe configuration of (b) of FIG. 9 is the same as the subframe configuration of (a) of FIG. 9, the description is omitted.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (b) of FIG. 9), the interference between the uplink communication and the downlink communication is prevented.

Furthermore, the guard time is the same for the examples of (a) of FIG. 9 and (b) of FIG. 9. Namely, in the method of adding the guard time of FIG. 9, the frame configurations can be made common between the cases where the TA control is performed and the TA control is not performed. Furthermore, for the case of (a) of FIG. 9, there is an advantage that, if the propagation delay almost does not exist, the timings of the uplink subframe and the downlink subframe coincide in the base station 20.

Figure 10:
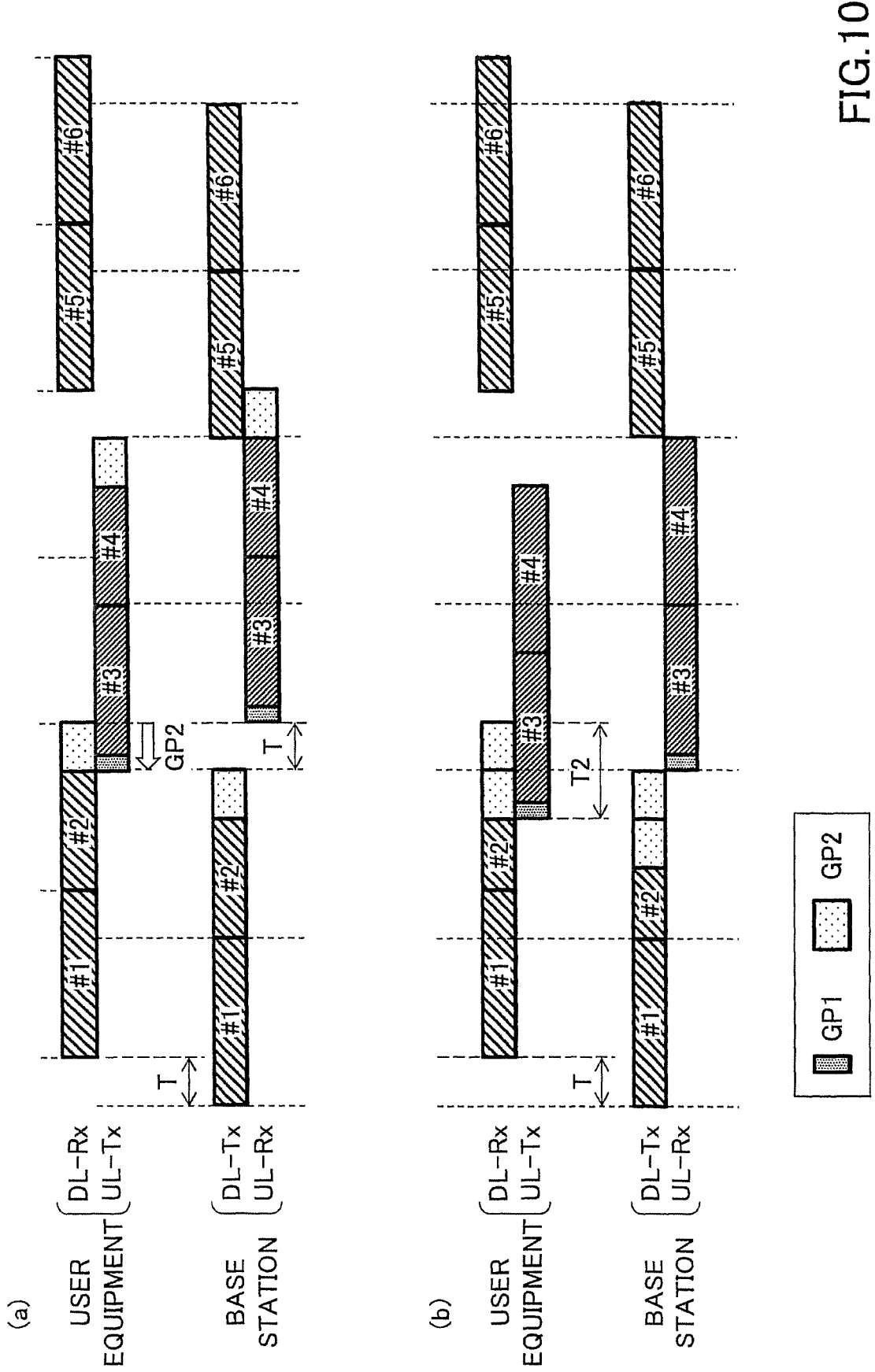
FIG. 10 is a diagram for illustrating the method of setting the guard time (version 8)

FIG. 10 is a diagram for illustrating the method of setting the guard time (version 8). In FIG. 10, (a) is an example of a method of setting the guard time for a case where the TA control is not performed. In FIG. 10, (b) is an example of a method of setting the guard time for a case where the TA control is performed. The points that are not particularly referred to are the same as those of FIG. 3.

First, (a) of FIG. 10 is described. In the example of (a) of FIG. 10, it is assumed that the user equipment 10 starts transmitting the uplink subframe at a timing that is advanced by the time GP2 from the timing of receiving the downlink subframe from the base station 20.

If a subframe subsequent to a downlink subframe is an uplink subframe, the base station 20 adds one GP2 to the end of the downlink subframe. In the example of (a) of FIG. 10, one GP2 is added to the end of the downlink subframe #2. Furthermore, if a subframe subsequent to a downlink subframe is an uplink subframe, the user equipment 10 adds one GP2 to the start of the uplink subframe. Furthermore, if a subframe subsequent to an uplink subframe is a downlink subframe, the user equipment 10 adds one GP2 to the end of the uplink subframe. In the example of (a) of FIG. 10, one GP1 is added to the start of the uplink subframe #3, and one GP2 is added to the end of the uplink subframe #4.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2 from the subframe #4) does not overlap an interval of the downlink subframe #5 including data (the whole interval in the example of (a) of FIG. 10), the interference between the uplink communication and the downlink communication is prevented.

Next, (b) of FIG. 10 is described. In the example of (b) of FIG. 10, it is assumed that the user equipment 10 starts transmitting the uplink subframe at a timing that is advanced by the time T2 from the timing of receiving the downlink subframe in accordance with the TA control from the base station 20.

If a subframe subsequent to a downlink subframe is an uplink subframe, the base station 20 adds two GP2s to the end of the downlink subframe. In the example of (b) of FIG. 10, two GP2s are added to the end of the downlink subframe #2. Furthermore, if a subframe subsequent to a downlink subframe is an uplink subframe, the user equipment 10 adds one GP1 to the end of the uplink subframe. In the example of (b) of FIG. 10, one GP1 is added to the end of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of (b) of FIG. 10) does not overlap an interval of the downlink subframe #5 including data (the whole interval in the example of (b) of FIG. 10), the interference between the uplink communication and the downlink communication is prevented.

Figure 11:
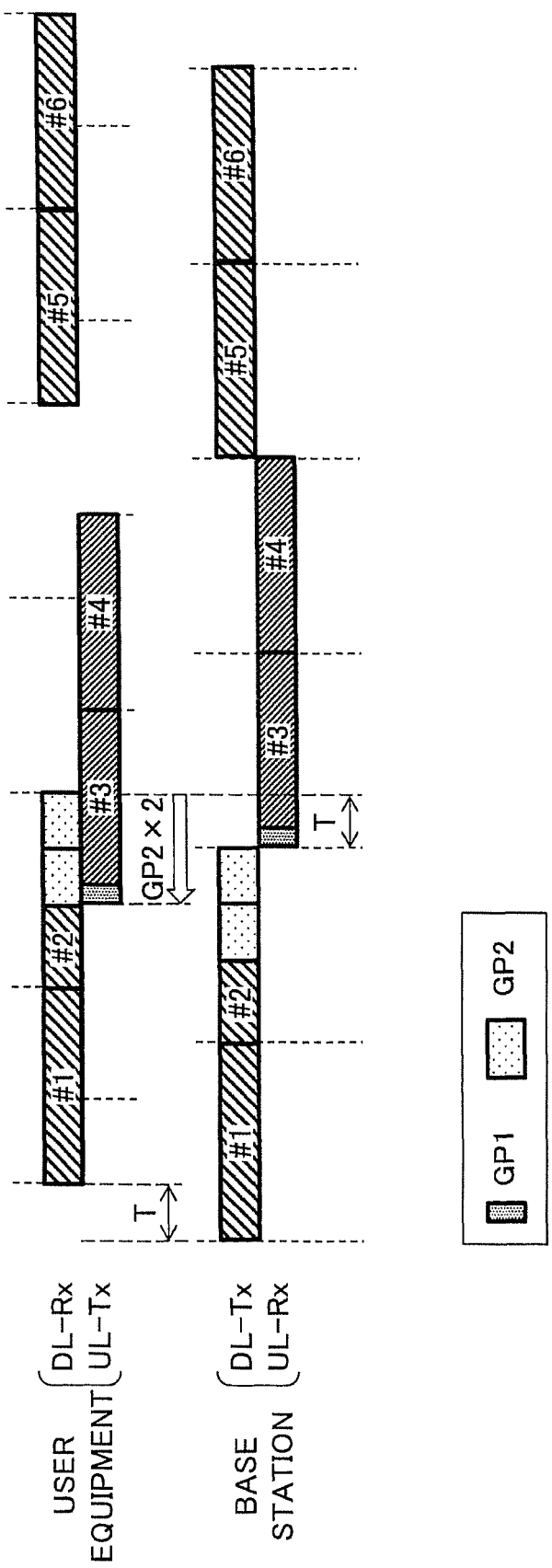
FIG. 11 is a diagram for illustrating the method of setting the guard time (version 9)

FIG. 11 is a diagram for illustrating the method of setting the guard time (version 9). FIG. 11 is an example of a method of setting the guard time for a case where the TA control is not performed. The points that are not particularly referred to are the same as those of FIG. 3.

In the example of FIG. 11, it is assumed that the user equipment 10 starts transmitting the uplink subframe at a timing that is advanced by twice the time GP2 from the timing of receiving the downlink subframe transmitted from the base station 20.

If a subframe subsequent to a downlink subframe is an uplink subframe, the base station 20 adds two GP2s to the end of the downlink subframe. In the example of FIG. 11, two GP2s are added to the end of the downlink subframe #2. Furthermore, if a subframe subsequent to a downlink subframe is an uplink subframe, the user equipment 10 adds one GP1 to the start of the uplink subframe. In the example of FIG. 11, one GP1 is added to the start of the uplink subframe #3.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example FIG. 11) does not overlap an interval of the downlink subframe #5 including data (the whole interval in the example of FIG. 11), the interference between the uplink communication and the downlink communication is prevented.

Note that the guard time in the example of FIG. 11 is the same as that of (b) of FIG. 10. Namely, in the method of adding the guard time of FIG. 11, the frame configurations can be made common between the cases where the TA control is performed and the TA control is not performed.

Figure 12:
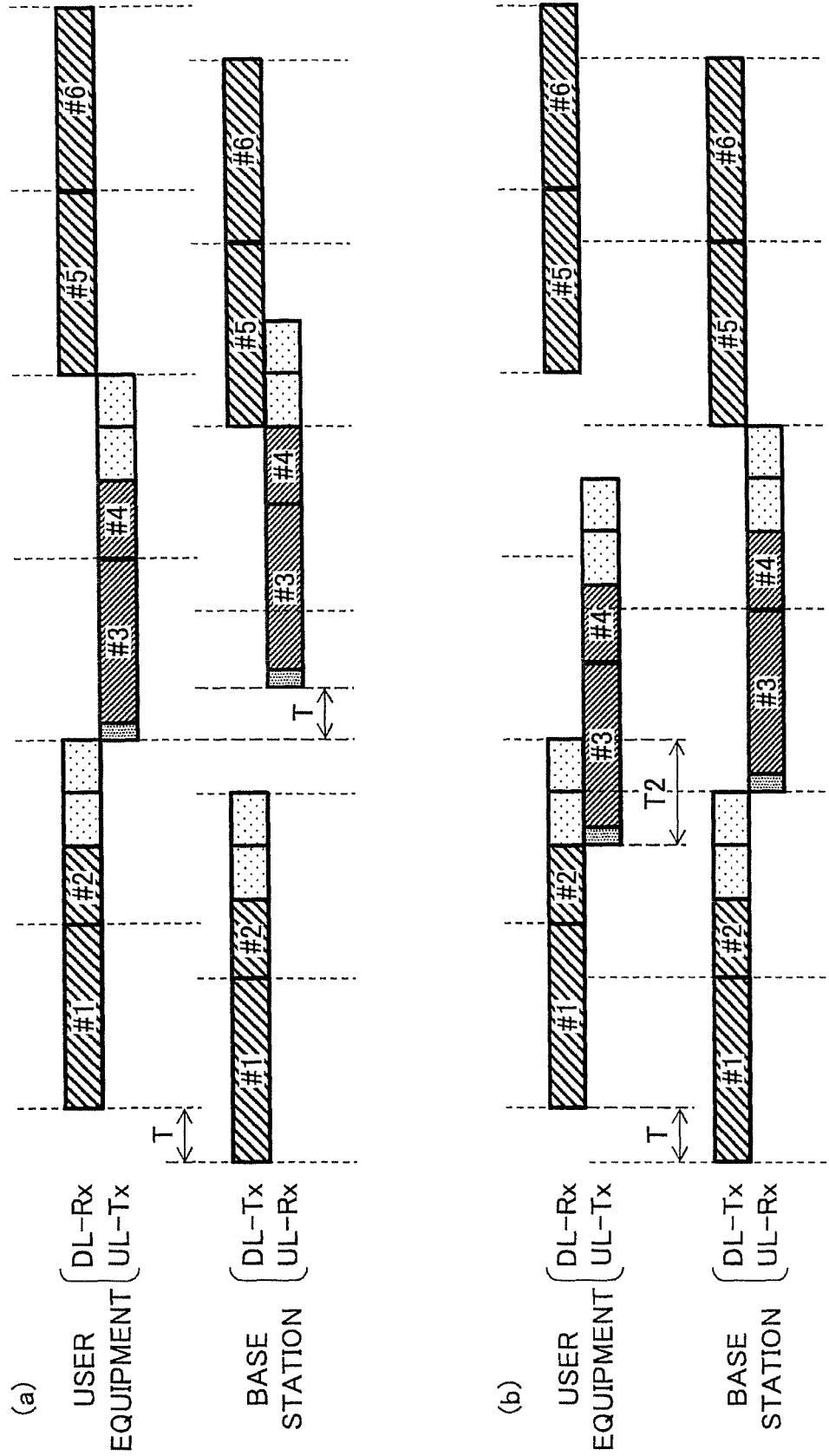
FIG. 12 is a diagram for illustrating the method of setting the guard time (version 10)

FIG. 12 is a diagram for illustrating the method of setting the guard time (version 10). In FIG. 12, (a) is an example of a method of setting the guard time for a case where the TA control is not performed. In FIG. 12, (b) is an example of a method of setting the guard time for a case where the TA control is performed. The points that are not particularly referred to are the same as those of FIG. 3.

First, (a) of FIG. 12 is described. In the example of (a) of FIG. 12, it is assumed that the user equipment 10 starts transmitting the uplink subframe at the timing of receiving the downlink subframe from the base station 20.

If a subframe subsequent to a downlink subframe is an uplink subframe, the base station 20 adds two GP2s to the end of the downlink subframe. In the example of (a) of FIG. 12, two GP2s are added to the end of the downlink subframe #2. Furthermore, if a subframe subsequent to a downlink subframe is an uplink subframe, the user equipment 10 adds one GP1 to the start of the uplink subframe. In the example of (a) of FIG. 12, one GP1 is added to the start of the uplink subframe #3.

Consequently, at the moment at which the downlink subframe #2 is switched to the uplink subframe #3, the guard time with the length that is greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (a) of FIG. 12), the interference between the uplink communication and the downlink communication is prevented.

Next, (b) of FIG. 12 is described. In the example of (b) of FIG. 12, it is assumed that the user equipment 10 starts transmitting the uplink subframe at a timing that is advanced by the time T2 from the timing of receiving the downlink subframe in accordance with the TA control from the base station 20. Since the subframe configuration of (b) of FIG. 12 is the same as the subframe configuration of (a) of FIG. 12, the description is omitted.

Consequently, at the moment at which the downlink subframe #2 is switched to the uplink subframe #3, the guard time with the length of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (b) of FIG. 12), the interference between the uplink communication and the downlink communication is prevented.

Furthermore, the guard time is the same for the examples of (a) of FIG. 12 and (b) of FIG. 12. Namely, in the method of adding the guard time of FIG. 12, the frame configurations can be made common between the cases where the TA control is performed and the TA control is not performed. Furthermore, for the case of (a) of FIG. 12, there is an advantage that, if the propagation delay almost does not exist, the timings of the uplink subframe and the downlink subframe coincide in the base station 20.

Figure 13:
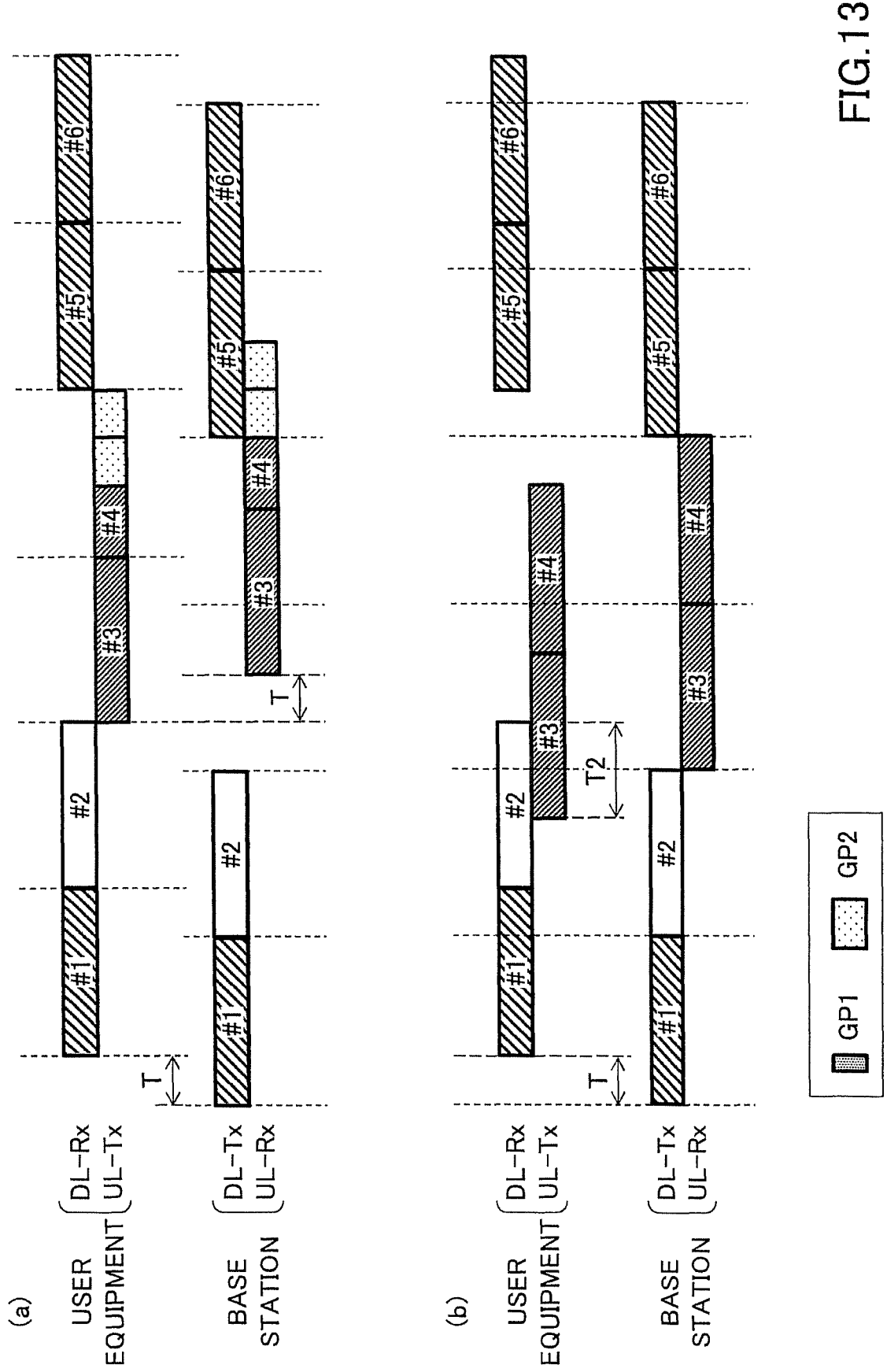
FIG. 13 is a diagram for illustrating the method of setting the guard time (version 11)

FIG. 13 is a diagram for illustrating the method of setting the guard time (version 11). In FIG. 13, (a) is an example of a method of setting the guard time for a case where the TA control is not performed. In FIG. 13, (b) is an example of a method of setting the guard time for a case where the TA control is performed. The points that are not particularly referred to are the same as those of FIG. 3. Note that, in FIG. 13, it is assumed that the TTI length is greater than the time obtained by adding the time of GP1 and twice the time of GP2.

First, (a) of FIG. 13 is described. In the example of (a) of FIG. 13, it is assumed that the user equipment 10 starts transmitting the uplink subframe at the timing of receiving the downlink subframe from the base station 20.

If a subframe subsequent to a downlink subframe is an uplink subframe, the base station 20 sets the entire downlink subframe to the guard time. In the example of (a) of FIG. 13, the entire downlink subframe #2 is set to the guard time. Furthermore, if a subframe subsequent to an uplink subframe is a downlink subframe, the user equipment 10 adds two GP2s to the end of the uplink subframe. In the example of (a) of FIG. 13, two GP2s are added to the end of the uplink subframe #4.

Consequently, at the moment at which the downlink subframe #2 is switched to the uplink subframe #3, the guard time with the length that is greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2s from the subframe #4) does not overlap an interval of the downlink subframe #5 including data (the whole interval in the example of (a) of FIG. 13), the interference between the uplink communication and the downlink communication is prevented.

Next, (b) of FIG. 13 is described. In the example of (b) of FIG. 13, it is assumed that the user equipment 10 starts transmitting the uplink subframe at a timing that is advanced by the time T2 from the timing of receiving the downlink subframe in accordance with the TA control from the base station 20.

If a subframe subsequent to a downlink subframe is an uplink subframe, the base station 20 sets the entire downlink subframe to the guard time. In the example of (b) of FIG. 13, the entire downlink subframe #2 is set to the guard time.

Consequently, at the moment at which the downlink subframe #2 is switched to the uplink subframe #3, the guard time with the length that is greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of (b) of FIG. 13) does not overlap an interval of the downlink subframe #5 including data (the whole interval in the example of (b) of FIG. 13), the interference between the uplink communication and the downlink communication is prevented.

Figure 14:
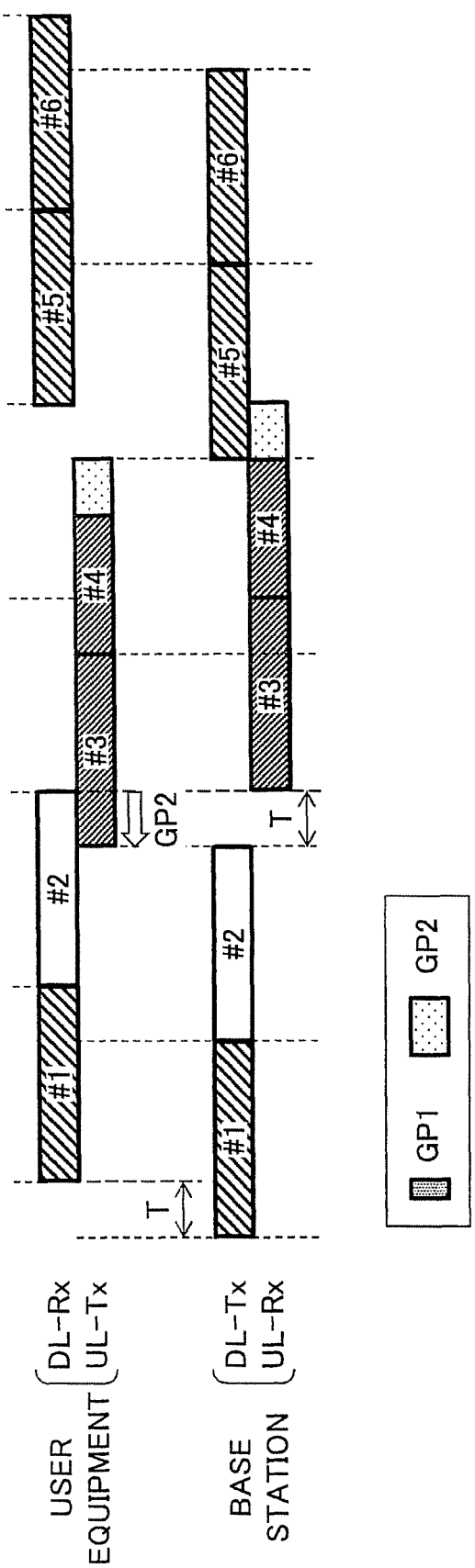
FIG. 14 is a diagram for illustrating the method of setting the guard time (version 12)

FIG. 14 is a diagram for illustrating the method of setting the guard time (version 12). FIG. 14 is an example of a method of setting the guard time for a case where the TA control is not performed. The points that are not particularly referred to are the same as those of FIG. 3.

In the example of FIG. 14, it is assumed that the user equipment 10 starts transmitting the uplink subframe at a timing that is advanced by the time GP2 from the timing of receiving the downlink subframe transmitted from the base station 20. Furthermore, it is assumed that the TTI length is greater than the time obtained by adding the time of GP1 and twice the time of GP2.

If a subframe subsequent to a downlink subframe is an uplink subframe, the base station 20 sets the entire downlink subframe to the guard time. In the example of FIG. 14, the entire downlink subframe #2 is set to the guard time. Furthermore, if a subframe subsequent to an uplink subframe is a downlink subframe, the user equipment 10 adds one GP2 to the end of the uplink subframe. In the example of FIG. 14, one GP2 is added to the end of the uplink subframe #4.

Consequently, at the moment at which the downlink subframe #2 is switched to the uplink subframe #3, the guard time with the length that is greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the interval obtained by removing the GP2 from the subframe #4) does not overlap an interval of the downlink subframe #5 including data (the whole interval in the example of FIG. 14), the interference between the uplink communication and the downlink communication is prevented.

Figure 15:
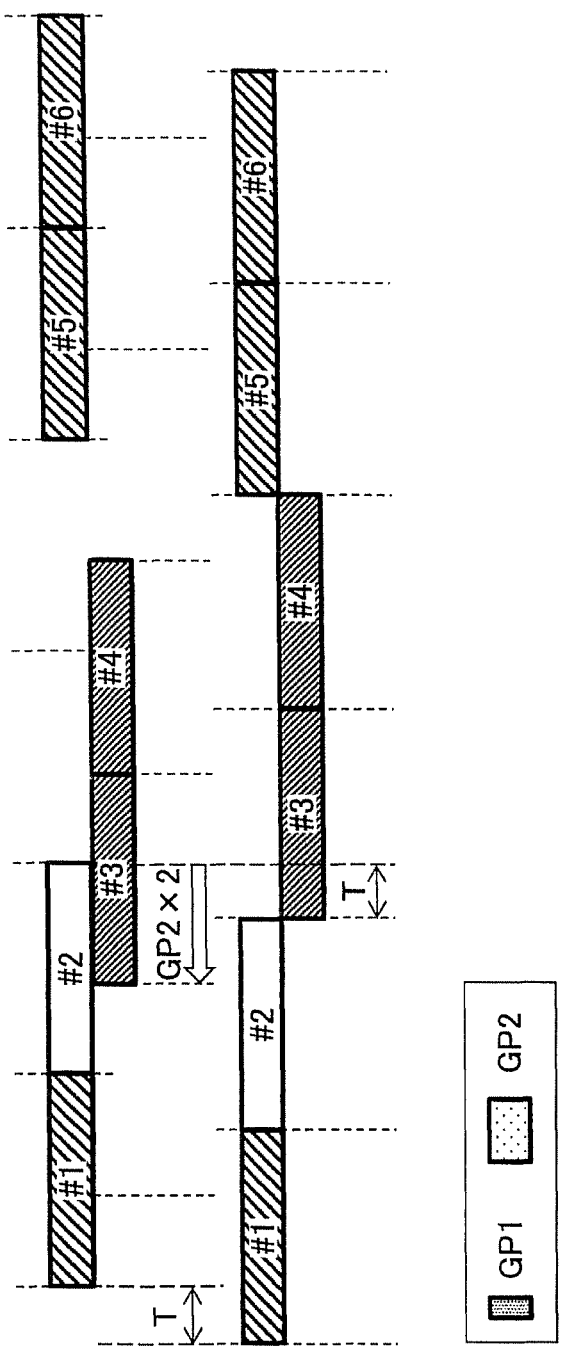
FIG. 15 is a diagram for illustrating the method of setting the guard time (version 13)

FIG. 15 is a diagram for illustrating the method of setting the guard time (version 13). FIG. 15 is an example of a method of setting the guard time for a case where the TA control is not performed. The points that are not particularly referred to are the same as those of FIG. 3.

In the example of FIG. 15, it is assumed that the user equipment 10 starts transmitting the uplink subframe at a timing that is advanced by twice the time GP2 from the timing of receiving the downlink subframe transmitted from the base station 20. Furthermore, it is assumed that the TTI length is greater than the time obtained by adding the time of GP1 and twice the time of GP2.

If a subframe subsequent to a downlink subframe is an uplink subframe, the base station 20 sets the entire downlink subframe to the guard time. In the example of FIG. 15, the entire downlink subframe #2 is set to the guard time.

Consequently, at the moment at which the downlink subframe #2 is switched to the uplink subframe #3, the guard time with the length that is greater than or equal to that of GP1 is necessarily added, so that the time for switching between transmission and reception in the user equipment 10 is reserved, and the interference between the uplink communication and the downlink communication is prevented. Furthermore, since an interval of the uplink subframe #4 including data (the whole interval in the example of FIG. 15) does not overlap an interval of the downlink subframe #5 including data (the whole interval in the example of FIG. 15), the interference between the uplink communication and the downlink communication is prevented.

The plurality of methods of setting the guard time is described above for the cases where the TA control is performed and the TA control is not performed; however, the length of the guard time can be replaced with the OFDM symbol length.

Figure 16:
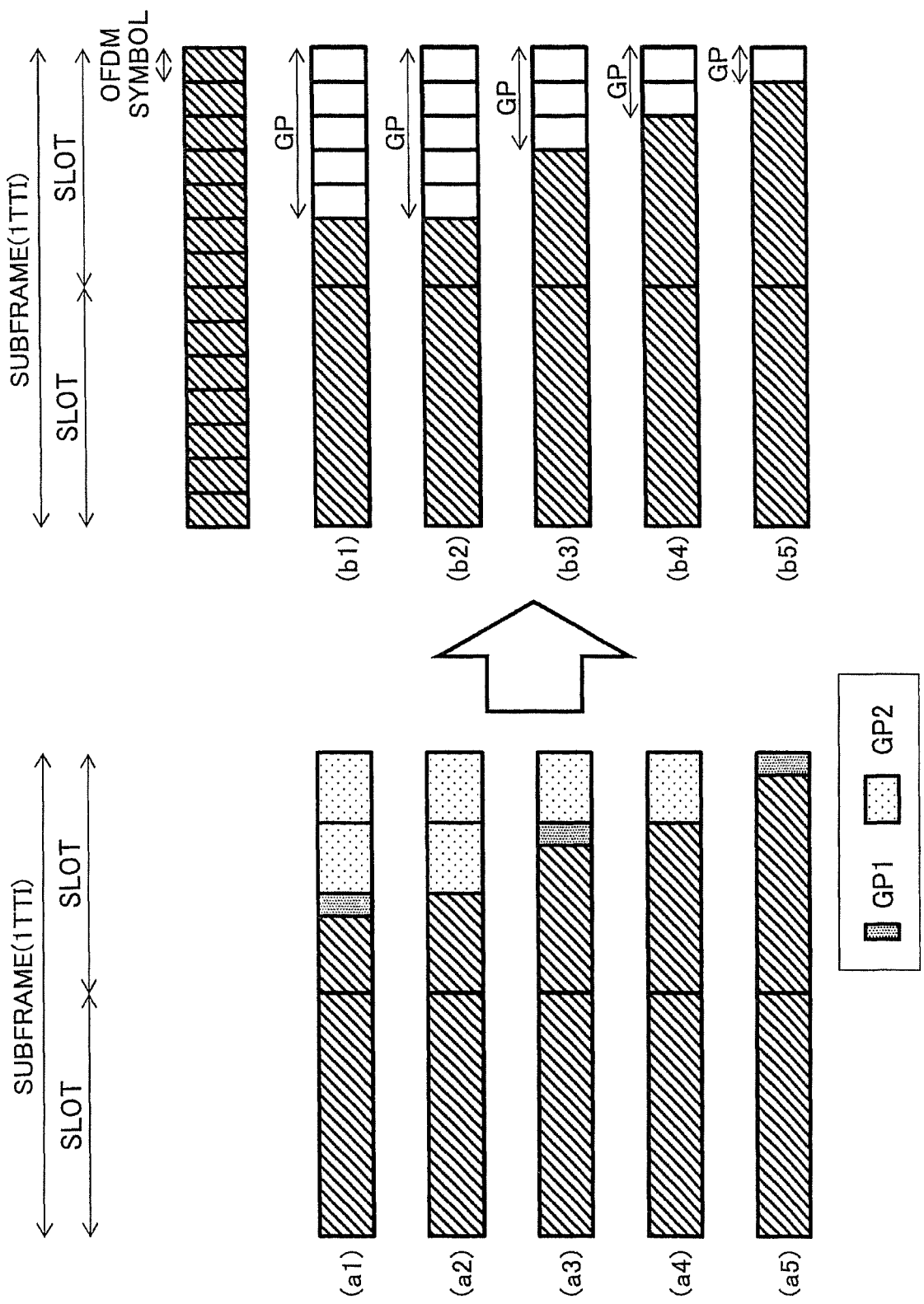
FIG. 16 is a diagram for illustrating a method of setting a guard time when a length of the guard time is replaced with an OFDM symbol length.

FIG. 16 is a diagram for illustrating a method of setting a guard time when a length of the guard time is replaced with an OFDM symbol length. FIG. 16 (a1) through FIG. 16 (a5) show examples of a subframe configuration to which GP1 or GP2 is added. FIG. 16 (b1) through FIG. 16 (b5) show examples of a subframe configuration such that the length of the guard time in each of FIG. 16 (a1) through FIG. 16 (a5) is replaced with a minimum required OFDM symbol length corresponding to the length.

For example, in FIG. 16 (a1), the guard time including one GP1 and two GP2s is added. If the time corresponding to five OFDM symbols is greater than the time of (GP1+GP2×2), the required guard time is to be reserved, even if FIG. 16(a1) is replaced with FIG. 16 (b1). Namely, the guard time to be added to each subframe illustrated in FIG. 3 through FIG. 15 may be replaced with the time corresponding to the length of multiples of the OFDM symbol length.

Note that, in the example of FIG. 16, the guard time is provided at the end of the subframe; however, for a case where the guard time is provided at the start of the subframe, it can be similarly replaced with an interval having the length of multiples of the OFDM symbol length.

The plurality of methods of setting the guard time is described above for the case where the TA control is performed and the case where the TA control is not performed. Note that, in FIG. 3 through FIG. 15, GP1 and GP2 may not be distinguished. Namely, the user equipment 10 and the base station 20 may add (set) the guard time obtained by combining GP1 and GP2, as a single guard time.

Note that, in FIG. 3 through FIG. 15, the uplink and the downlink are switched in units of subframes; however, for example, it can be applied to a configuration where the uplink and the downlink are switched in the middle of a subframe. In this case, GP1 and GP2 are placed in the middle of the subframe.

(Method of Setting the Guard Time (in Units of OFDM Symbols))

The radio communication system according to the embodiment may perform communication by the dynamic TDD scheme that operates to switch uplink and downlink in units of OFDM symbols. In this case, the methods of setting the guard time described in FIG. 3 through FIG. 15 can also be applied.

Figure 17:
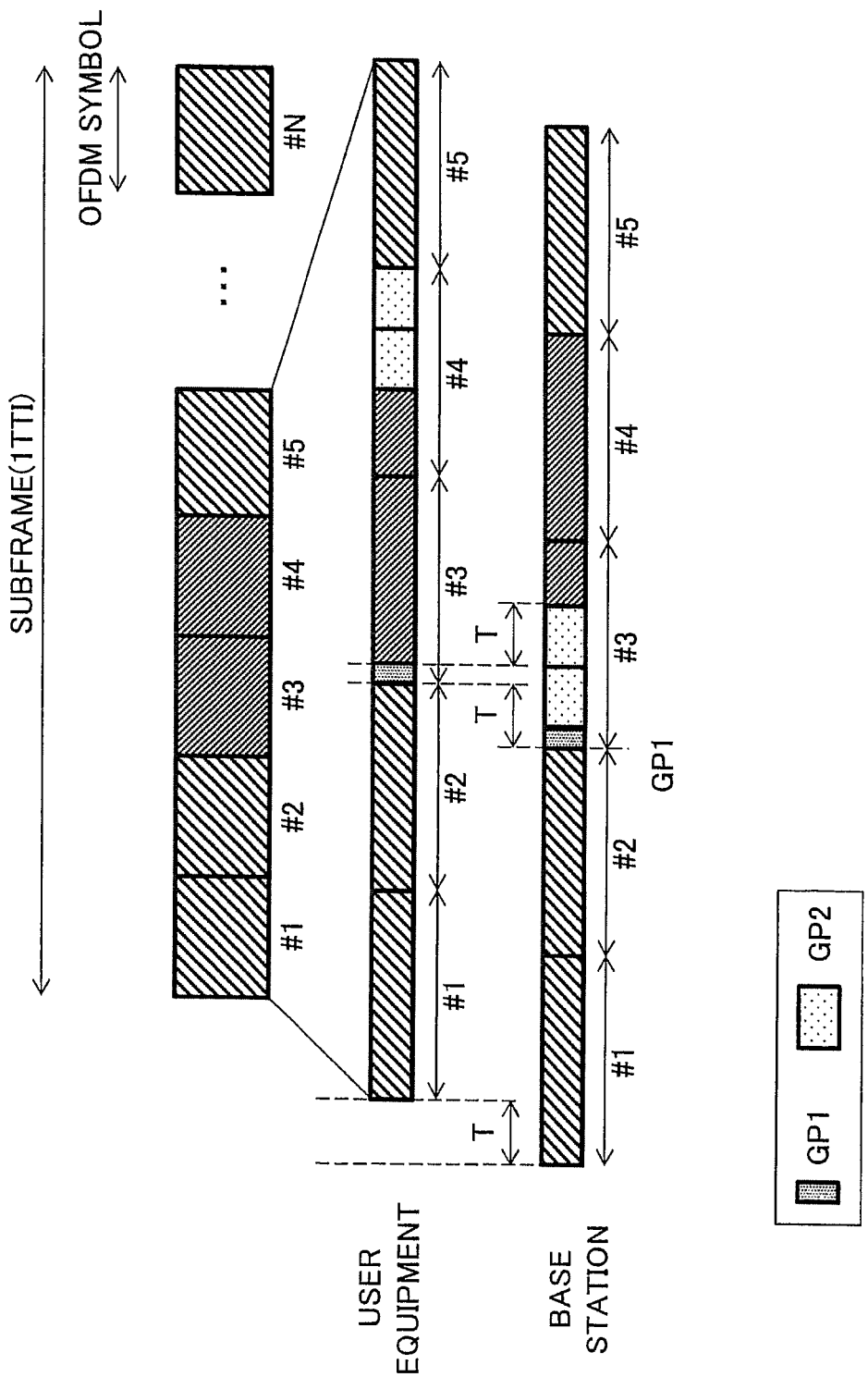
FIG. 17 is a diagram for illustrating an example of a method of setting a guard time when a subframe is replaced with units of OFDM symbols.

FIG. 17 is a diagram for illustrating an example of the method of setting the guard time when the subframe is replaced with units of OFDM symbols. Here, #1 through #N respectively indicate OFDM symbols included in 1 TTI. Furthermore, it is assumed that the TA control is performed in FIG. 17. Here, "T," "GP1," and "GP2" are the same as those of FIG. 3.

First, if the OFDM symbols #1, #2, and #5 are configured for the downlink, and the OFDM symbols #3 and #4 are configured for the uplink, the guard time including one GP1 and two GP2s is added to the former half of the OFDM symbol #3, which is recognized by the base station 20. Additionally, the guard time including two GP2s is to be added to the latter half of the OFDM symbol #4, which is recognized by the user equipment 10. Consequently, even if the delay time is the maximum, in the user equipment 10, the guard time of GP1 remains between the OFDM symbol #2 and the OFDM symbol #3, so that the time for the user equipment 1 to switch between transmission and reception is reserved, and interference between the uplink communication and the downlink communication can be prevented. Furthermore, in the base station 20, the interval of the OFDM symbol #4 including the uplink data does not overlap the interval of the OFDM symbol #5 including the downlink data, so that the interference between the uplink communication and the downlink communication is prevented.

Note that the method of setting the guard time of FIG. 17 is obtained by replacing the subframe configuration of the base station 20 of (b) of FIG. 3 with the OFDM symbol configuration. Thus, in the methods of setting the guard time other than that of (b) of FIG. 3 (the methods of setting the guard time that are described in FIG. 3 through FIG. 15), the units of subframes can be similarly replaced with the units of the OFDM symbols. Namely, in the radio communication system according to the embodiment, the methods of setting the guard time of FIG. 3 through FIG. 15 may be applied to the method of setting the guard time in the dynamic TDD scheme that operates to switch between the uplink and the downlink in units of OFDM symbols.

Note that, if, in the method of setting the guard time illustrated in FIG. 17, the guard time is to be provided at the start of the OFDM symbol, the interval of the cyclic prefix (Cyclic Prefix) included in the start of the OFDM symbol may not be transmitted.

Figure 18:
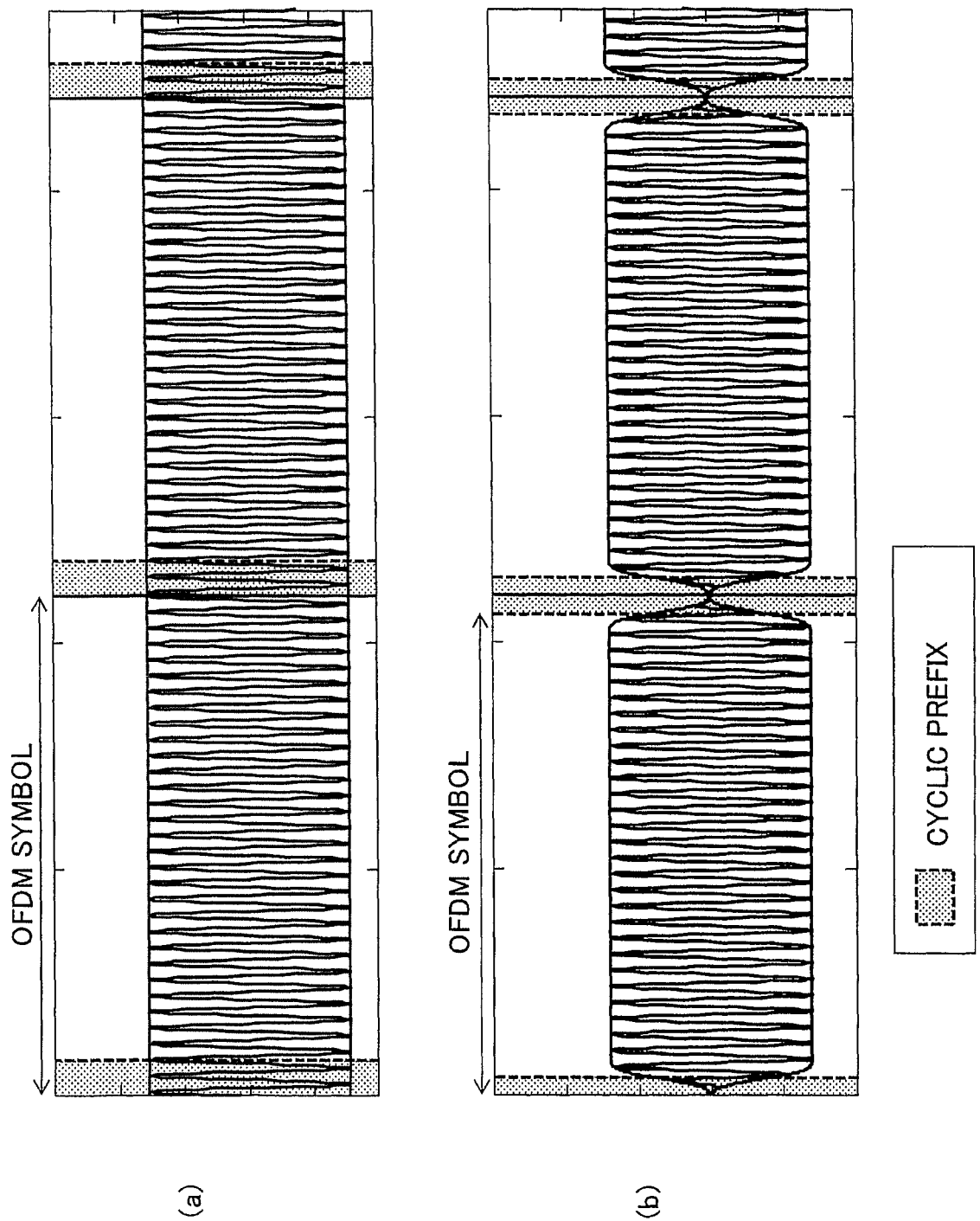
FIG. 18 is a diagram illustrating an example of a signal waveform of a cyclic prefix.

FIG. 18 is a diagram illustrating an example of a signal waveform of the cyclic prefix. Here, (a) of FIG. 18 is an example of a signal waveform of the cyclic prefix in usual LTE; and (b) of FIG. 18 is an example of a signal waveform where the cyclic prefix is not transmitted. For example, in the OFDM symbol #3 of FIG. 17, the guard time is added to the start. The guard time includes the cyclic prefix. Thus, in the OFDM symbol #3 of FIG. 17, the whole guard time including the cyclic prefix may not be transmitted.

Note that, in the radio communication system according to the embodiment, the cyclic prefix may not be transmitted regardless of whether the guard time exists. Furthermore, depending on the type of the physical channel, it may be selected as to whether the cyclic prefix is not to be transmitted. For example, for the physical channel (e.g., PDSCH, PUSCH) for data transmission, the cyclic prefix including the waveform may be used, similar to usual LTE, so as to prevent the effect of the multipath; and, for the physical channel that is used for transmission of a reference signal, etc., used for the channel quality measurement, the cyclic prefix may not be transmitted.

For example, for the component technology that is referred to as the "massive MIMO," it has been studied to perform beam forming that utilizes multiple beams with narrow beam widths by installing multiple antennas (example: 100 elements) at the base station side. For such a base station that performs the beam forming, methods have been studied that are for performing beam forming by varying the weight to be applied to each antenna by a digital method, and for performing beam forming by varying the weight to be applied to each antenna by an analog method.

When the beam forming based on the analog method is to be performed, the phase is to be electrically varied, so that it is expected that, depending on the timing to vary, the out-of-band radiation increases, and it can be a cause of interference. Thus, the base station 20 can suppress the interference by setting the interval of the cyclic prefix to the non-transmission state, and by varying the phase during the interval of the cyclic prefix.

(Dynamic Control of the Guard Time)

When communication is to be performed in accordance with the dynamic TDD scheme in the radio communication system according to the embodiment, the base station 20 can dynamically control a ratio between the uplink and the downlink. Namely, the base station 20 determines whether each subframe is to be allocated to an uplink signal or to be allocated to a downlink signal; and reports the determined subframe configuration to the user equipment 10. Furthermore, the base station 20 reports, to the user equipment 10, how to set the guard time with respect to the determined subframe configuration.

Figure 19A:
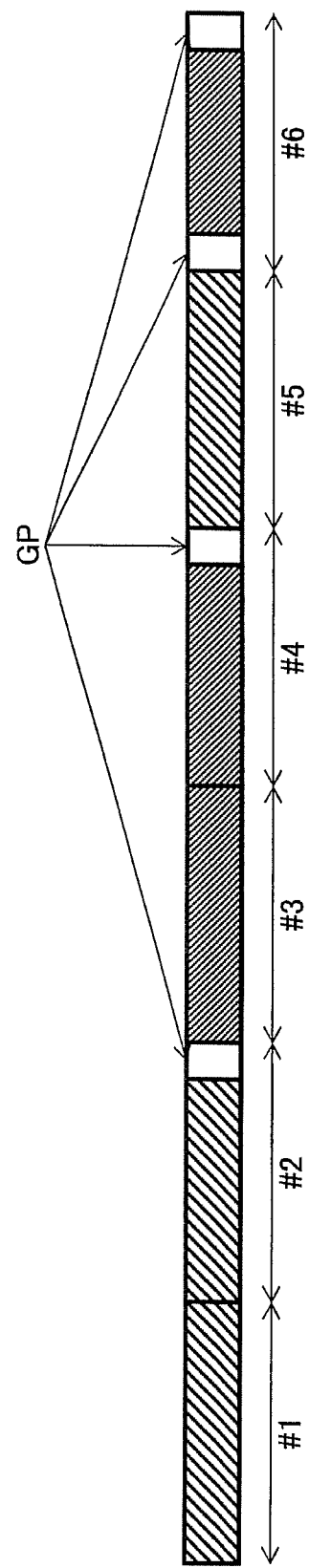
FIG. 19A is a diagram for illustrating a scheme for dynamically controlling a subframe configuration.

FIG. 19A and FIG. 19B are diagrams for illustrating the method of dynamically controlling the subframe configuration. First, the base station 20 determines a plurality of contiguous subframe configurations; and reports, to the user equipment 10, the determined subframe configuration through a control signal (e.g., EPDCCH (Enhanced Physical Data Control Channel)). The user equipment 10 recognizes the reported subframe configuration; and performs communication with the base station 20 depending on necessity.

FIG. 19A is an example of the subframe configuration determined by the base station 20. For example, as illustrated in FIG. 19A, the base station 20 determines the subframe configuration such that, among the plurality of contiguous subframes (#1 through 6), the subframes #1, #2, and #5 are to be allocated to the uplink; and the subframes #3, #4, and #6 are to be allocated the downlink; and that the guard time is set at the end of the subframe #2, at the end of the subframe #4, and at the start and the end of the subframe #6. Furthermore, the base station 20 may apply, among the methods of setting the guard time described in FIG. 3 through FIG. 17, a predetermined method of setting the subframe configuration. Furthermore, a plurality of setting methods may be selectively used. For example, the setting method of (b) of FIG. 3 may be applied to predetermined contiguous subframes; and to the subsequent contiguous subframes, the setting method of (b) of FIG. 5 may be applied.

By transmitting a control signal (e.g., EPDCCH) with the subframe allocated to the downlink, the base station 20 reports, to the user equipment 10, the determined subframe configuration.

FIG. 19B is an example of a subframe configuration report signal that is for reporting the subframe configuration from the base station 20 to the user equipment 10. In the subframe configuration report signal illustrated in FIG. 19B, a "direction identifier" that indicates whether a subframe is allocated to the uplink or allocated to the downlink, and a "GP type identifier" that indicates presence or absence of the guard time in the subframe and the method of setting the guard time are repeatedly stored. The base station 20 reports, to the user equipment 10, the subframe configuration of the contiguous subframes by including the subframe configuration report signal in the control signal (e.g., EPDCCH).

For example, when the six contiguous subframe configuration illustrated in FIG. 19A is to be reported to the user equipment 10, the base station 20 transmits, to the user equipment 10, the subframe configuration report signal such that the "directional identifier" and the "GP type identifier" are repeated six times.

The "directional identifier" may be formed of 1 bit, for example. For example, if "0" is set, it may indicate that the uplink is allocated; and if "1" is set, it may indicate that the downlink is allocated.

The "GP type identifier" may be an identifier formed of two bits, for example. If "00" is set, it may indicate that the guard time is not included; and specific methods of setting the guard time may be allocated to "01," "10," and "11," respectively. Furthermore, the first one bit of the "GP type identifier" may be utilized as the identifier indicating presence or absence of the guard time; and the specific method of setting the guard time may be allocated to the subsequent one bit. Furthermore, the "GP type identifier" may be formed of three or more bits. The various method of setting the guard time described in FIG. 3 through FIG. 17 can be allocated.

Note that it may be determined in advance between the base station 20 and the user equipment 10 as to which subframe configuration on and after which subframe is to be reported by the subframe configuration report signal transmitted through the control signal. For example, the user equipment 10 may recognize that the subframe configuration reported by the subframe configuration signal is to be applied from a subframe subsequent to the subframe in which the subframe configuration signal is received. Furthermore, the subframe configuration report signal illustrated in FIG. 19B may be extended, so that the subframe configuration report signal may include a bit sequence that specifies the start position of the subframe.

Note that the base station 20 may periodically transmit the subframe configuration report signal to the user equipment 10, depending on the traffic condition. Furthermore, if the subframe configuration is to be changed, the base station 20 may transmit the subframe configuration report signal; and, if no subframe configuration signal is received, the user equipment 10 may recognize that the subframe configuration reported by the most recently received subframe configuration report signal is to be repeatedly applied.

Furthermore, as illustrated in FIG. 17, the radio communication system according to the embodiment may perform communication by the dynamic TDD scheme that operates to switch the uplink and the downlink in units of the OFDM symbols in the same subframe. Thus, the base station 20 may report the subframe configuration (e.g., the subframe configuration as in the example of FIG. 17) to the user equipment 10 by using the subframe configuration report signal only including the "GP type identifier," instead of the subframe configuration report signal indicated in FIG. 19B.

Furthermore, the base station 20 may report, to the user equipment 10, the subframe configuration of the subframes to which the TA control is to be applied together with the subframe configuration of the subframes to which the TA control is not to be applied. In this case, the subframe configuration report signal may be extended, so that a bit sequence can be included, which specifies whether, for each subframe, the TA control is to be applied or the TA control is not to be applied.

Furthermore, the subframe configuration report signal may be reported to the user equipment 10 by the MAC layer, or the RRC signal.

Note that the format of the subframe configuration report signal illustrated in FIG. 19B is an example, and it is not limited to this; and another format configuration may be used.

<Functional Configuration>
(User Equipment)

Figure 20:
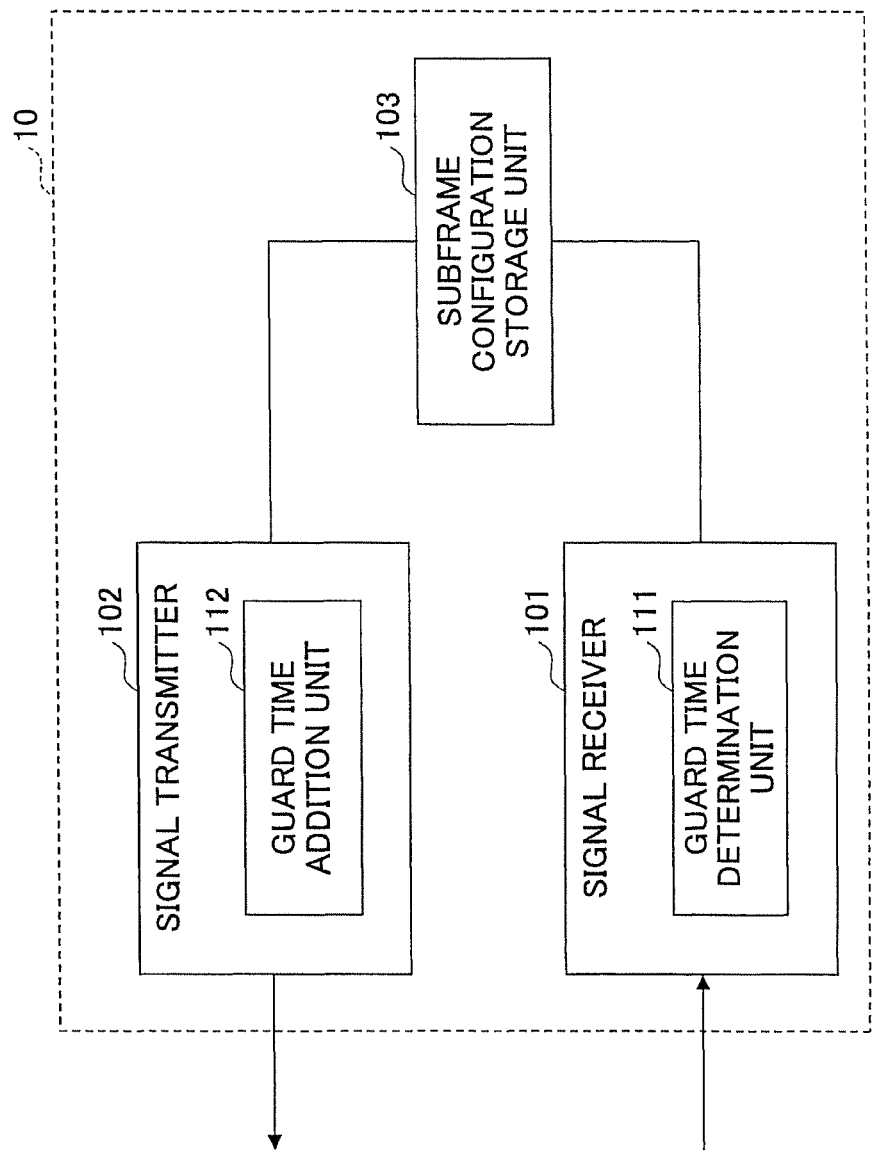
FIG. 20 is a diagram illustrating an example of a functional configuration of user equipment according to the first embodiment.

FIG. 20 is a diagram illustrating an example of a functional configuration of the user equipment according to the first embodiment. As illustrated in FIG. 20, the user equipment 10 includes a signal receiver 101; a signal transmitter 102; and a subframe configuration storage unit 103. Furthermore, the signal receiver 101 includes a guard time determination unit 111. Furthermore, the signal transmitter 102 includes a guard time addition unit 112. FIG. 20 only illustrates, in the user equipment 10, functional units that are particularly related to the embodiment of the present invention; and it is assumed that at least functions, which are not depicted, for performing the operation conforming to LTE are included. Furthermore, the functional configuration illustrated in FIG. 20 is merely an example. The functional division and the names of the functional units may be any division and names, provided that the operation according to the embodiment can be executed.

The signal receiver 101 obtains information on a higher layer from a lower layer signal received by radio. Furthermore, the signal receiver 101 receives the subframe configuration report signal from the base station 20, and stores it in the subframe configuration storage unit 103.

The signal transmitter 102 generates a lower layer signal from higher layer information, and transmits it by radio. Furthermore, if a cyclic prefix is included in the guard time set (added) at the guard time addition unit 112, the signal transmitter 102 may control, so that the cyclic prefix is in the non-transmission state. Note that the signal transmitter 102 may select whether the cyclic prefix is not to be transmitted, depending on the type of the physical channel. Furthermore, the signal transmitter 102 may perform communication by separating, in the same band width, a band for performing the TA control and a band for not performing the TA control.

The subframe configuration storage unit 103 stores the subframe configuration included in the subframe configuration report signal reported from the base station 20. The subframe configuration storage unit 103 recognizes the subframe configuration for each subframe from the various types of identifiers included in the subframe configuration report signal, and stores them in a memory.

The guard time determination unit 111 determines (recognizes) the location of the guard time included in the downlink subframe received by the signal receiver 101 based on the subframe configuration stored in the subframe configuration storage unit 103; and, when the signal receiver 101 demodulates a radio signal, the guard time determination unit 111 controls the signal receiver 101, so that the radio signal can be correctly demodulated. Furthermore, the guard time determination unit 111 may determine (recognize) the guard time in units of OFDM symbols; and, when the signal receiver 101 demodulates a radio signal, the guard time determination unit 111 may control the signal receiver 101, so that the radio signal can be correctly demodulated. Furthermore, the guard time determination unit 111 may determine (recognize) one or more positions of one or more guard times that are set in the same OFDM symbol; and the guard time determination unit 111 may control the signal receiver 101, so that the signal receiver 101 can correctly demodulate the radio signal.

The guard time addition unit 112 sets (adds) the guard time to the uplink subframe, based on the subframe configuration stored in the subframe configuration storage unit 103. Furthermore, the guard time addition unit 112 may set (add) the guard time in units of OFDM symbols. Furthermore, the guard time addition unit 112 may set (add) one or more guard times in the same OFDM symbol.

(Base Station)

Figure 21:
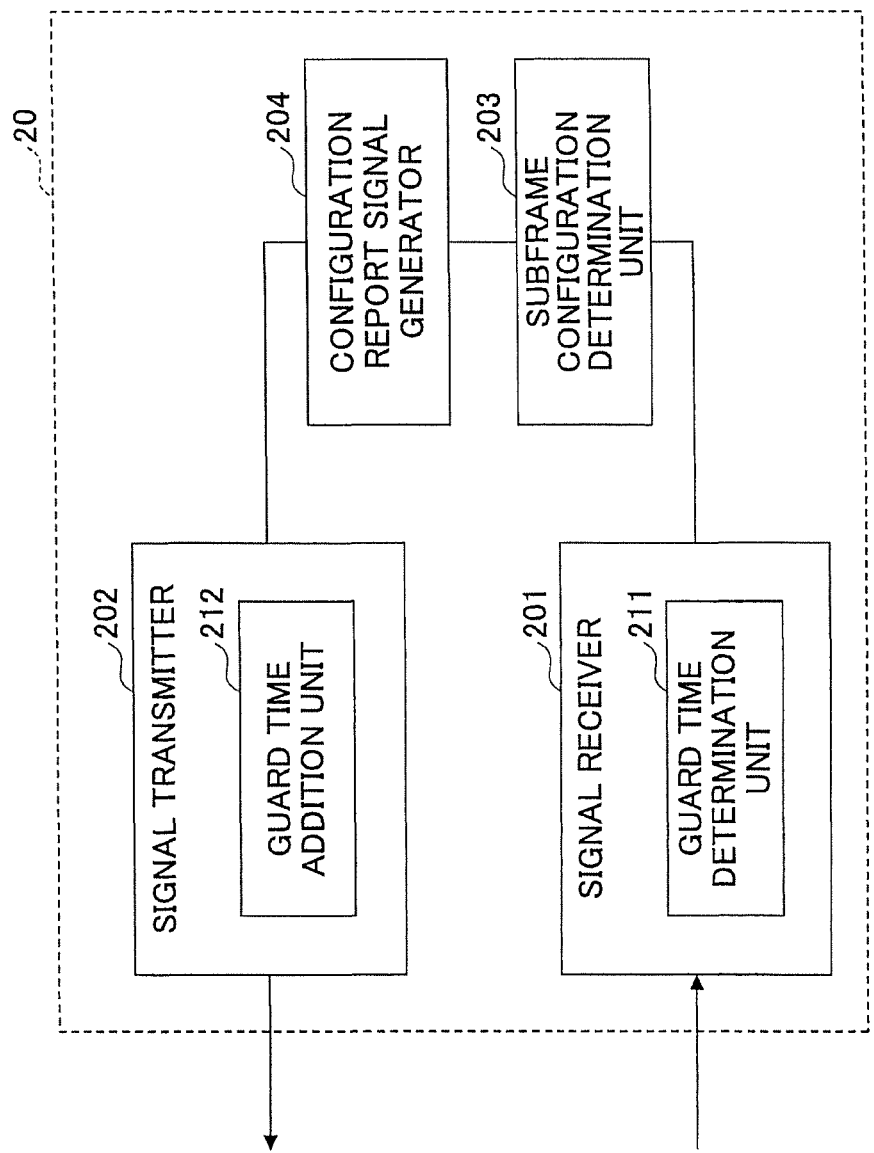
FIG. 21 is a diagram illustrating an example of a functional configuration of a base station according to the first embodiment.

FIG. 21 is a diagram illustrating an example of a functional configuration of the base station according to the first embodiment. As illustrated in FIG. 21, the base station 20 includes a signal receiver 201; a signal transmitter 202; a subframe configuration determination unit 203; and a configuration report signal generator 204. Furthermore, the signal receiver 201 includes a guard time determination unit 211. Furthermore, the signal transmitter 202 includes a guard time addition unit 212. FIG. 21 only illustrates, in the base station 20, functional units that are particularly related to the embodiment of the present invention; and it is assumed that at least functions, which are not depicted, for performing the operation conforming to LTE are included. Furthermore, the functional configuration illustrated in FIG. 21 is merely an example. The functional division and the names of the functional units may be any division and names, provided that the operation according to the embodiment can be executed.

The signal receiver 201 obtains information on a higher layer from a lower layer signal received by radio.

The signal transmitter 202 generates a lower layer signal from higher layer information, and transmits it by radio. Furthermore, if a cyclic prefix is included in the guard time set (added) at the guard time addition unit 212, the signal transmitter 202 may control, so that the cyclic prefix is in the non-transmission state. Note that the signal transmitter 202 may select whether the cyclic prefix is not to be transmitted, depending on the type of the physical channel. Furthermore, the signal transmitter 202 transmits, to the user equipment 10, the subframe configuration report signal generated by the configuration report signal generator 204. The signal transmitter 202 may transmit the subframe configuration report signal to the user equipment 10 by the physical channel (e.g., PDCCH, EPDCCH); or may transmit the subframe configuration report signal to the user equipment 10 by the MAC and RRC control signals.

The subframe configuration determination unit 203 determines, depending on the traffic condition, etc., a configuration ratio between the uplink subframe and the downlink subframe, and a method of setting the guard time for each subframe. Furthermore, the subframe configuration determination unit 203 stores the determined subframe configuration in a memory. The subframe configuration determination unit 203 may periodically determine the subframe configuration; or may detect a traffic variation, and may determine (change) the subframe configuration if the traffic variation exceeds a predetermined threshold value.

The configuration report signal generator 204 generates the subframe configuration report signal to be reported to the user equipment 10 based on the subframe configuration determined by the subframe configuration determination unit 203. The configuration report signal generator 204 transmits the generated subframe configuration report signal to the signal transmitter 202.

The guard time determination unit 211 determines (recognizes) the location of the guard time included in the downlink subframe received by the signal receiver 201 based on the subframe configuration stored in the subframe configuration storage unit 203; and, when the signal receiver 201 demodulates a radio signal, the guard time determination unit 211 controls the signal receiver 201, so that the radio signal can be correctly demodulated. Furthermore, the guard time determination unit 211 may determine (recognize) the guard time in units of OFDM symbols; and, when the signal receiver 201 demodulates a radio signal, the guard time determination unit 211 may control the signal receiver 201, so that the radio signal can be correctly demodulated. Furthermore, the guard time determination unit 211 may determine (recognize) one or more positions of one or more guard times that are set in the same OFDM symbol; and the guard time determination unit 211 may control the signal receiver 201, so that the signal receiver 201 can correctly demodulate the radio signal.

The guard time addition unit 212 sets (adds) the guard time to the uplink subframe, based on the subframe configuration stored in the subframe configuration storage unit 203. Furthermore, the guard time addition unit 212 may set (add) the guard time in units of OFDM symbols. Furthermore, the guard time addition unit 212 may set (add) one or more guard times in the same OFDM symbol.

The first embodiment is described above. According to the radio communication system in the first embodiment, when communication is performed in accordance with the dynamic TDD, the communication can be efficiently performed by the appropriate uplink/downlink configuration ratio depending on the traffic condition.

Second Embodiment

Next, the second embodiment is described base on the drawings. Here, descriptions of the components that are the same as those of the first embodiment are omitted. Furthermore, the points that are not particularly referred to may be the same as those of the first embodiment.

<Overview>

It is assumed that, in the radio communication system according to the second embodiment, a communication scheme based on full duplex is used that allows the base station 20 to simultaneously transmit and receive an uplink signal and a downlink signal in the same band width.

LTE based on a usual FDD (Frequency Division Duplex) scheme is a communication scheme that multiplexes the uplink and the downlink in frequency domains of different bands. Furthermore, LTE based on the TDD scheme is a communication scheme that multiplexes the uplink and the downlink in the time axis domain at the same frequency. Here, the communication scheme based on the full duplex is said to be a communication scheme that multiplexes the uplink and downlink in both the frequency domain and the time axis domain. According to the communication scheme based on the full duplex, the base station 20 is to simultaneously perform transmission of a downlink signal and reception of an uplink signal at the same frequency and the same time. The base station 20 extracts the received uplink signal by cancelling the downlink signal transmitted by itself from the received uplink signal. Namely, the base station 20 can extract the uplink signal transmitted from the user equipment 10 by multiplexing a signal obtained by phase-converting the downlink signal transmitted by itself to be in the opposite phase and the received uplink signal.

Additionally, in the radio communication system according to the embodiment, physical channels used for transmission/reception of a control signal and for transmission/reception of user data are separated in the frequency domain; and an uplink control signal and a downlink control signal are separated in the frequency domain. Furthermore, depending on necessity, a subcarrier that does not include a signal (which is referred to as a "guard subcarrier" or "GC: Guard sub Carrier," hereinafter) is provided between a resource block that stores an uplink control signal and a resource block that stores a downlink control signal. In this manner, the radio communication system according to the embodiment can eliminate the effect of the frequency shift, etc., caused by the Doppler effect; and ensure reception quality of the control signal.

Figure 22:
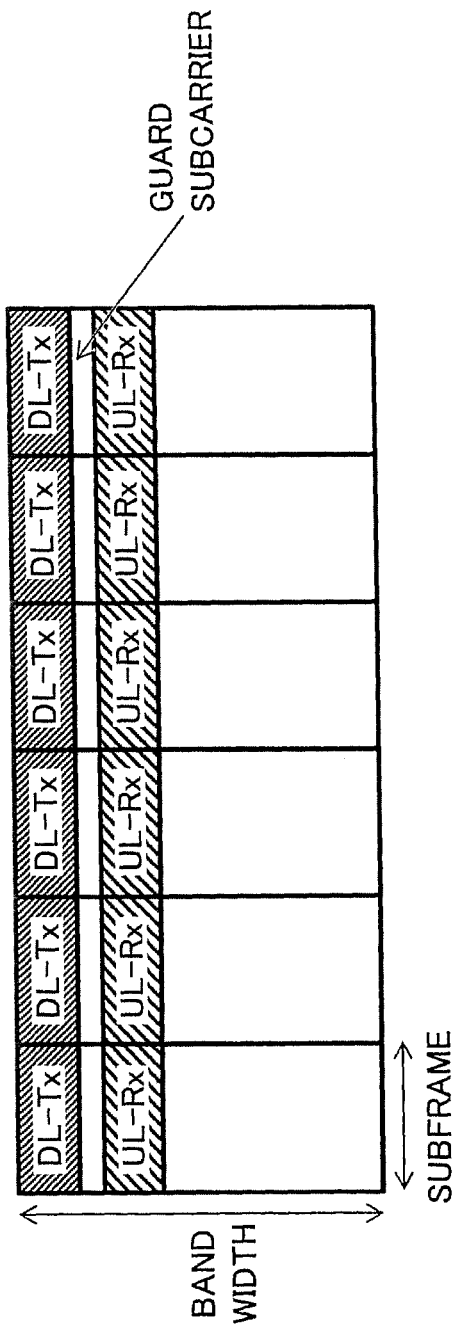
FIG. 22 is a diagram illustrating a communication scheme based on full duplex according to a second embodiment.

FIG. 22 is a diagram for illustrating the communication scheme based on the full duplex according to the second embodiment. The example of FIG. 22 shows the resource block configuration when it is viewed from the base station 20. In FIG. 22, the "DL-Tx" indicates a resource block in which a downlink control signal is stored; and the "UL-Rx" indicates a resource block in which an uplink control signal is stored. Furthermore, a guard subcarrier is provided between the resource block where the "DL-Tx" is stored and the resource block where the "UL-Rx" is stored. The guard subcarrier may be provided between the resource blocks; or a part of subcarriers in a resource block may correspond to the guard subcarrier.

Note that, in the example of FIG. 22, one resource block that stores the "DL-Tx" and one resource block that stores the "UL-Rx" are depicted in the same subframe; however, a configuration may be adopted such that multiple resource blocks, each storing the "DL-Tx," are included. Similarly, a configuration may be adopted such that multiple resource blocks, each storing the "UL-Rx," are included in the same subframe. Furthermore, it may not be necessary to provide a guard subcarrier; and it may be determined depending on a characteristic, etc., of the physical channel.

Note that, in the embodiment, the user equipment 10 may transmit and receive control signals by the half duplex, namely, by the TDD scheme; or may simultaneously transmit and receive uplink/downlink control signals by the full duplex scheme, similar to the base station 20.

Note that, in the example of FIG. 22, it is depicted that the two resource blocks in the subframe have the same configurations; however, it is not limited to this. For example, the configurations of the resource blocks may be changed in units of slots. Furthermore, the guard subcarrier is not limited to one subcarrier; and a plurality of contiguous subcarriers may be collectively used as a guard subcarrier.

<Processing Method>

(Dynamic Control of the Resource Block Configuration)

A processing procedure for dynamically controlling a resource configuration is described below. In the radio communication system according to the embodiment, the resource block configuration within the same subframe is determined by the base station 20; and it is reported to the user equipment 10 by using a signal indicating the resource block configuration (which is referred to as a "resource block configuration report signal," hereinafter). Note that the base station 20 may appropriately change the resource block configuration depending on types, signal amounts, and so forth of the various types of control signals (e.g., PDCCH, EPDCCH, PUCCH, EPUCCH, CSI-RS, SRS) communicated with the user equipment 10. The user equipment 10 recognizes a resource block configuration of a predetermined resource block storing uplink/downlink control signals, based on the received resource block configuration report signal.

Figure 23:
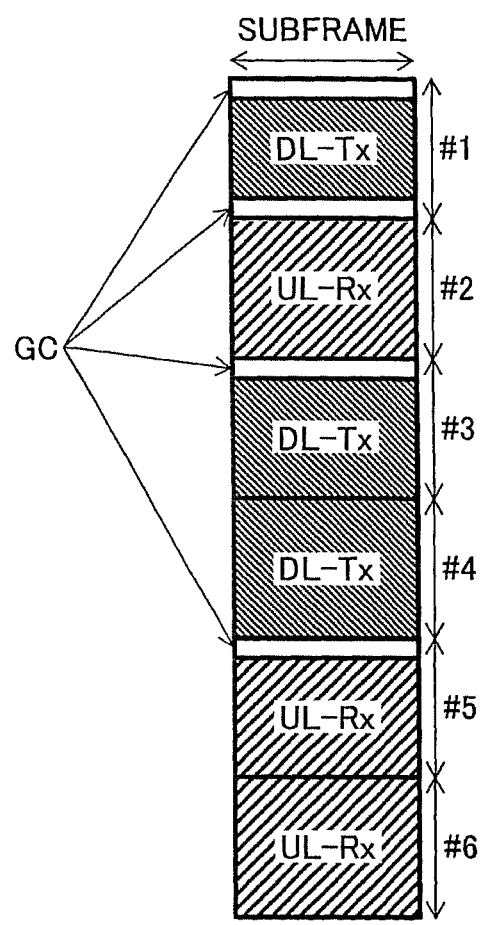
FIG. 23 is a diagram illustrating an example of a resource block configuration in the communication scheme based on the full duplex.

FIG. 23 is a diagram showing an example of the resource block configuration in the communication scheme based on the full duplex. In the example of FIG. 23, the resource block #1 is a resource block that is allocated to a downlink control signal; and has a configuration including the guard subcarriers above and below. The resource block #2 is a resource block that is allocated to an uplink control signal; and has a configuration that does not include any guard subcarrier. The resource block #3 is a resource block that is allocated to a downlink control signal; and has a configuration including the guard subcarriers above and below. The resource block #4 is a resource block that is allocated to a downlink control signal; and has a configuration that does not include any guard subcarrier. The resource block #5 is a resource block that is allocated to an uplink control signal; and has a configuration that includes a guard subcarrier at an upper part. The resource block #6 has the same configuration as that of the resource block #2. As shown in FIG. 23, in the embodiment, various resource block configurations can be used. Note that FIG. 23 is merely an example, and the base station 20 may determine a resource block configuration to be different from that of FIG. 23.

FIG. 24 is a diagram showing an example of a signal format of the resource block configuration report signal. In the resource block configuration report signal shown in FIG. 24, the following are repeatedly stored: the "RB type identifier" for identifying whether a resource block is the resource block allocated to a downlink control signal or the resource block allocated to an uplink control signal; the "GC presence/absence identifier" indicating the presence or absence of a guard subcarrier in the resource block; and the "GC type identifier" indicating which position of the resource block the guard subcarrier is added. For example, as shown in FIG. 23, when six resource block configurations are to be reported to the user equipment 10, the "RB type identifier," the "GC presence/absence identifier," and the "GC type identifier" that are repeated six times are stored in the resource block configuration report signal.

The "RB type identifier" may be formed of one bit, for example. For example, if "0" is set, it may indicate that an uplink control signal is allocated; and if "1" is set, it may indicate that a downlink control signal is allocated.

The GC presence/absence identifier" may be formed of one bit, for example. For example, if "0" is set, it may indicate that no guard subcarrier is included; and if "1" is set, it may indicate that a guard subcarrier is included.

The "GC type identifier" may be formed of two bits, for example. For example, if "00" is set, it may indicate that a guard subcarrier is included at an upper part; if "01" is set, it may indicate that a guard subcarrier is included at a lower part; and if "10" is set, it may indicate that guard subcarriers are included at the top and bottom.

Note that the "GC type identifier" may be formed of one bit, for example. Although the identifiable positions of the guard subcarrier are limited to two types, the signal amount can be reduced.

Note that the base station may transmit the resource block configuration report signal to the user equipment 10 by using physical control channels that are individually set for respective units of user equipment 10, such as the EPDCCH; or may transmit to the user equipment 10 by using a physical control channel that can be commonly referred to by the units of user equipment 10, such as the PDCCH.

Furthermore, the base station 20 may cut out only a resource block configuration required for each user equipment 10 (used by the user equipment 10); and may report it to the user equipment 10 by using a physical control channel individually set for each user equipment 10 (e.g., EPDCCH). The reason is that, in the present embodiment, when the user equipment 10 transmits and receives control signals by the TDD scheme, the uplink and the downlink are switched for each subframe when it is viewed from the user equipment 10.

Furthermore, an identifier for indicating a position of a resource block (which is referred to as a RB location identifier) may be included in the resource block configuration report signal. For example, the "RB location identifier," the "RB type identifier," the "GC presence/absence identifier," and the "GC type identifier" may be repeatedly included in the resource block configuration report signal. In this manner, a resource block configuration at any location can be reported to the user equipment 10.

Furthermore, a resource block configuration of a plurality of contiguous subframes may be repeatedly included in the resource block configuration report signal. The base station 20 can collectively report, to the user equipment 10, the resource block configurations of the plurality of contiguous subframes, and the number of times of reporting can be reduced.

Furthermore, the base station 20 may periodically transmit the resource block configuration report signal to the user equipment 10; or may transmit the resource block configuration report signal to the user equipment 10 at a required timing.

(Configuration of the Control Signal)

Next, a configuration of the control signal (e.g., a physical channel) is described, with which the resource block configuration report signal is to be transmitted.

In the resource block of the control signal with which the resource block configuration signal is to be transmitted, a guard time may be set in a part of the resource block, as described in the first embodiment. Furthermore, as in this embodiment, a guard subcarrier may be set in a part of the resource block.

Figure 25:
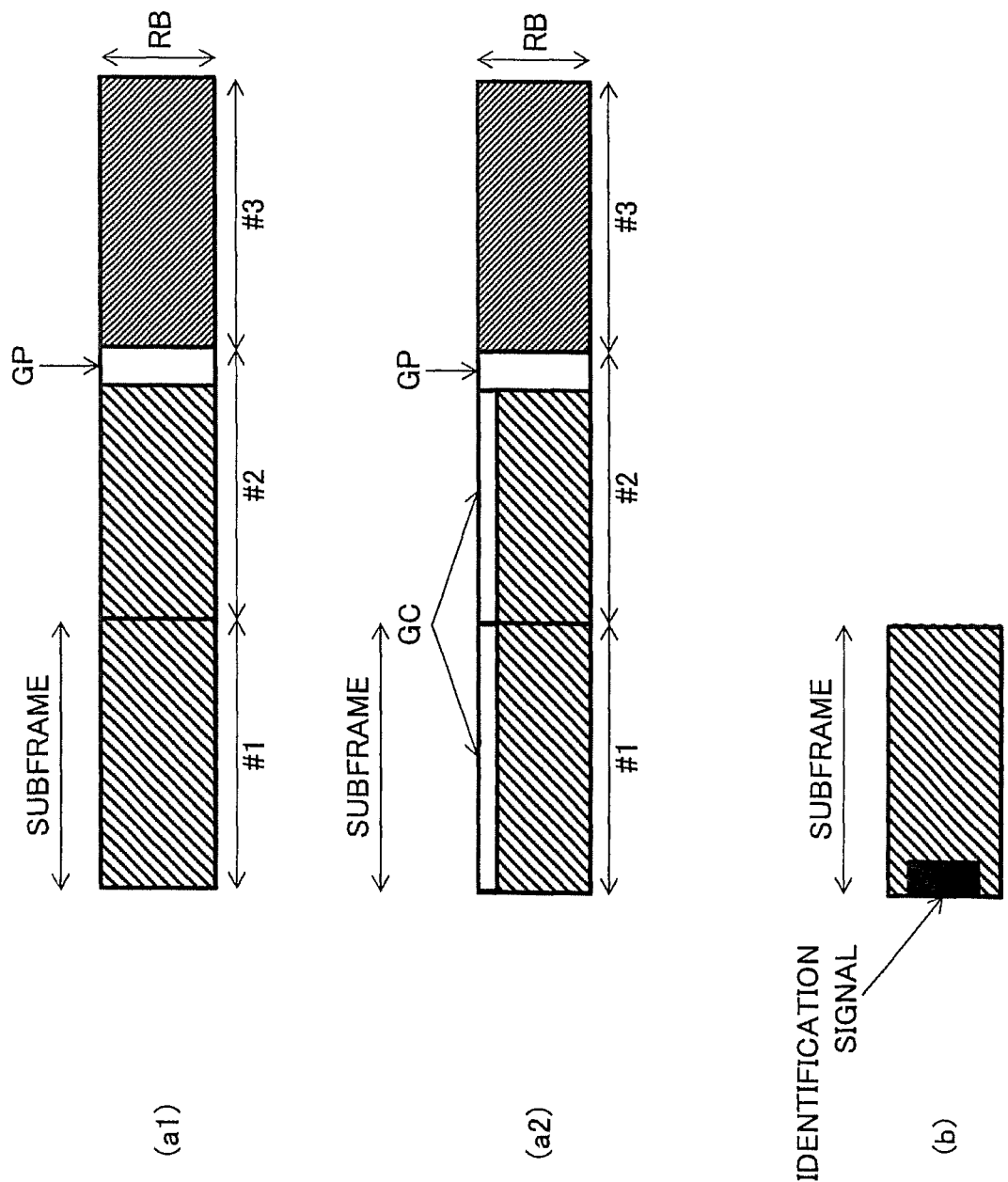
FIG. 25 is a diagram illustrating a configuration of a control signal in which a resource block configuration report signal is transmitted.

FIG. 25 is a diagram for illustrating a configuration of the control signal with which the resource block configuration report signal is to be transmitted. For example, the resource block #1 of (a1) of FIG. 25 is an example of a resource block of the control signal which does not include any guard time and guard subcarrier. The resource block #2 of (a1) of FIG. 25 is an example of a resource block of the control signal that includes the guard time at the end of the subframe (immediately before the uplink subframe #3). The resource block #1 of (a2) of FIG. 25 is an example of a resource block of the control signal provided with the guard subcarrier on the top surface. The resource block #2 of (a2) of FIG. 25 is an example of a resource block of the control signal provided with the guard subcarrier on the top surface and the guard time at the end of the subcarrier (immediately before the uplink subframe #3).

The user equipment 10 is required to find a configuration of the resource blocks of the control signals in advance, so that the control signal is correctly demodulated when the resource block configuration report signal is retrieved from the control signal with which the resource block configuration report signal is transmitted.

As a first method, a method can be considered such that the user equipment 10 attempts to demodulate all the configurations that are specified in advance between the user equipment 10 and the base station 20 as configurations of the resource blocks of the control signal. For example, if it is specified between the user equipment 10 and the base station 20 in advance that the control signal may have any configuration of the resource blocks #1 and #2 of (a1) of FIG. 25 and the resource blocks #1 and #2 of (a2) of FIG. 25, the user equipment 10 attempts to demodulate all the configurations.

Namely, if the CRC (Cyclic Redundancy Check) does not match at the time of demodulation, the user equipment 10 sequentially attempts to demodulate in accordance with another configuration; and if the CRC matches, the user equipment 10 recognizes that the resource block configuration is correct.

As the second method, a method can be considered such that the resource block configuration of the control signal with which the resource block configuration report signal is to be transmitted is fixedly specified between the user equipment 10 and the base station 20.

As a third method, it can be considered such that the base station 20 stores an identification signal indicating the configuration of the resource blocks at the start of the resource block of the control signal with which the resource block configuration report signal is to be transmitted, so that the user equipment 10 can find the resource block configuration of the control signal by referring to the identification signal at first. The identification signal includes, for example, information indicating whether a guard subcarrier or a guard time is included in a resource block of the control signal with which the resource block configuration report signal is to be transmitted; or information indicating, when a guard subcarrier or a guard time is included, at what position, the guard subcarrier or the guard time is included.

In FIG. 25, (b) illustrates an example of the position where the identification signal is stored. For example, the identification signal may be stored in a region where no guard subcarrier is to be set, or it can be mapped onto one or more OFDM symbols at the start of the resource block, so that the identification signal can be referred to regardless of the type of the resource block configuration. In FIG. 25, (b) is an example, and the identification signal may be stored in another location. Furthermore, the identification signal may be mapped onto the DCI (Downlink Control Information) to be reported in the PDCCH; or may be reported, to the user equipment 10, through system information, a MAC signal, or a RRC signal.

The configuration of the control signal with which the resource block configuration report signal is to be transmitted is described above. The control signal may be, for example, an EPDCCH, or may be a physical channel with a frame configuration similar to that of the EPDCCH. The frame configuration similar to that of the EPDCCH is, for example, a frame configuration such that, within a predetermined subframe, a signal is stored in the entire resource block, except for the region where the PDCCH is stored (the first through third OFDM symbols at the start). The control signal is not limited to the EPDCCH, and may be another physical channel.

<Functional Configuration>

(User Equipment)

Figure 26:
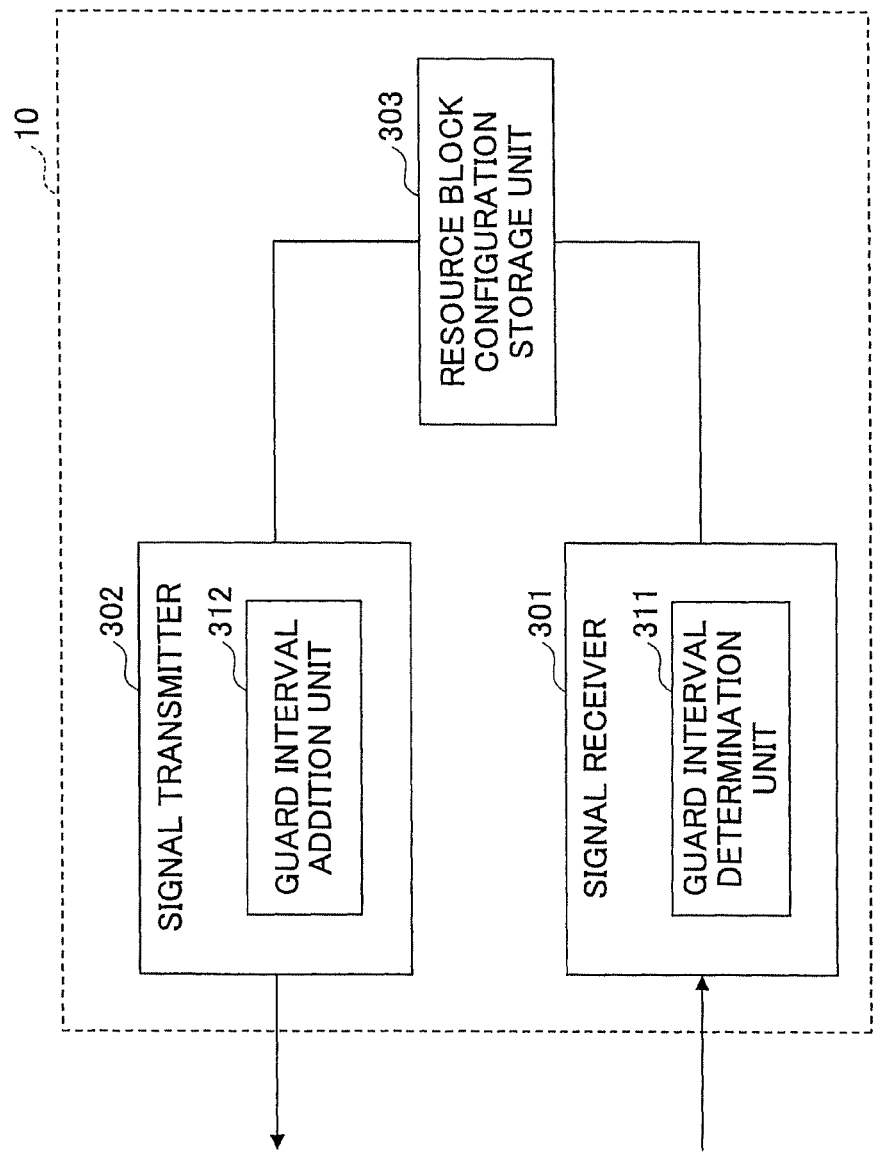
FIG. 26 is a diagram illustrating an example of a functional configuration of user equipment according to the second embodiment.

FIG. 26 is a diagram illustrating an example of a functional configuration of the user equipment according to the second embodiment. As illustrated in FIG. 26, the user equipment 10 includes a signal receiver 301; a signal transmitter 302; and a resource block configuration storage unit 303. Furthermore, the signal receiver 301 includes a guard interval determination unit 311. Furthermore, the signal transmitter 302 includes a guard interval addition unit 312.

The signal receiver 301 retrieves higher layer information from a lower layer signal received through radio. Furthermore, the signal receiver 301 receives a resource block configuration report signal from the base station 20; and stores it in the resource block configuration storage unit 303. Furthermore, when the control signal with which the resource block configuration report signal is transmitted (mapped) is to be demodulated, the signal receiver 301 demodulates the control signal based on an identification signal indicating a signal format (the configuration of the resource blocks) of the control signal. Note that the signal receiver 301 may store, in advance, a plurality of signal formats (configurations of the resource blocks) corresponding to the control signal; and may obtain the resource block configuration report signal by demodulating the control signal by attempting to demodulate in accordance with all the signal formats.

The signal transmitter 302 generates a lower layer signal from higher layer information to transmit it through radio.

The resource block configuration storage unit 303 stores a resource block configuration included in a resource block configuration report signal reported from the base station 20. The resource block configuration storage unit 303 finds a resource block configuration for each resource block from various types of identifiers included in the resource block configuration report signal; and stores it in a memory.

The guard interval determination unit 311 determines (finds) a location of a guard subcarrier that is set in a resource block, in which the downlink control signal received by the signal receiver 301 is included (mapped), based on the resource block configuration stored in the resource block configuration storage unit 303; and controls the signal receiver 301, so that, when the signal receiver 301 demodulates a radio signal, the radio signal is correctly demodulated.

The guard interval addition unit 312 sets (adds) a guard subcarrier to a resource block in which an uplink control signal is included (mapped) based on the resource block configuration stored in the resource block configuration storage unit 303.

(Base Station)

Figure 27:
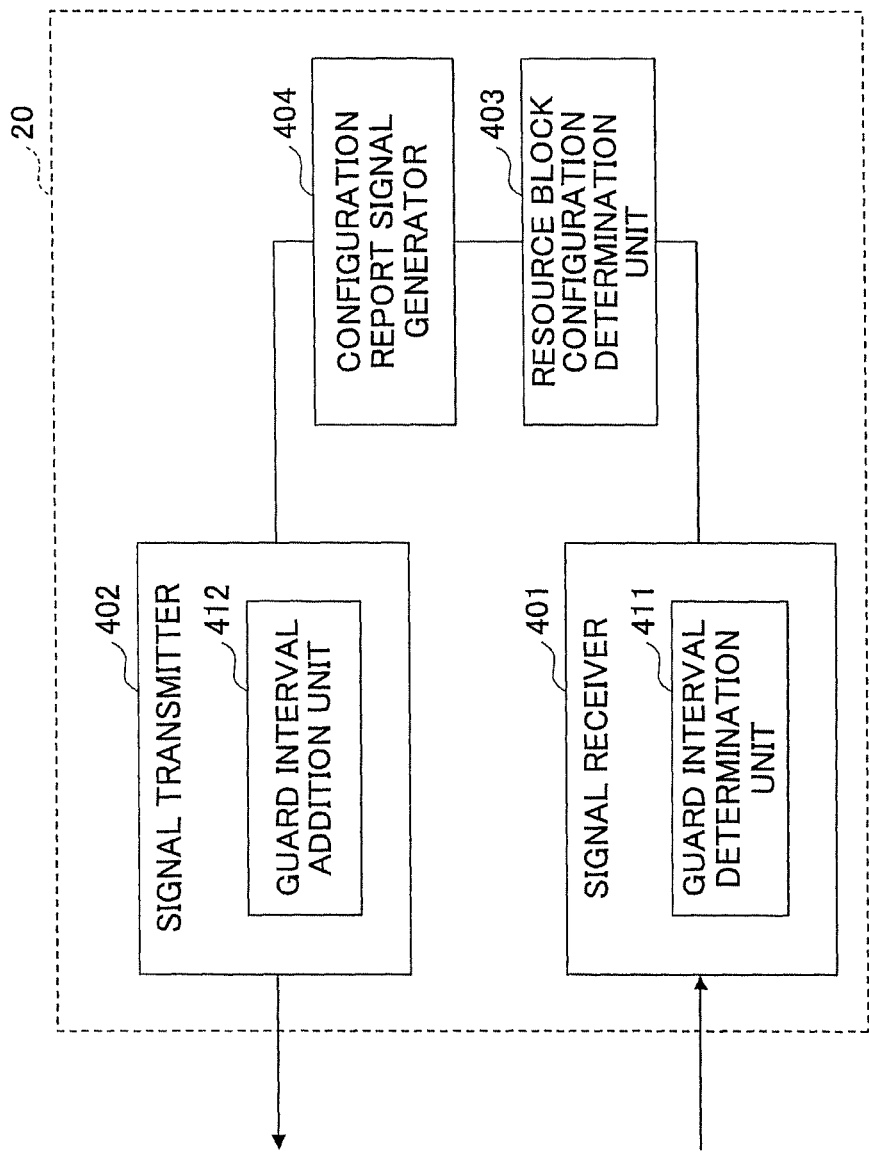
FIG. 27 is a diagram illustrating an example of a functional configuration of a base station according to the second embodiment.

FIG. 27 is a diagram illustrating an example of a functional configuration of the base station according to the second embodiment. As illustrated in FIG. 27, the base station 20 includes a signal receiver 401; a signal transmitter 402; a resource block configuration determination unit 403; and a configuration report signal generator 404. Furthermore, the signal receiver 401 includes a guard interval determination unit 411. Furthermore, the signal transmitter 402 includes a guard interval addition unit 412.

The signal receiver 401 retrieves higher layer information from a lower layer signal received through radio.

The signal transmitter 402 generates a lower layer signal from higher layer information to transmit it through radio. Furthermore, the signal transmitter 402 transmits, to the user equipment 10, a resource block configuration report signal generated by the configuration report signal generator 404. The signal transmitter 402 may transmit, to the user equipment 10, the resource block configuration report signal through a physical channel (e.g., PDCCH, EPDCCH); or may transmit, to the user equipment 10, the resource block configuration report signal through a MAC or RRC control signal.

The resource block configuration determination unit 403 determines resource block configurations of a resource block in which an uplink signal is included (mapped) and a resource block in which a downlink signal is included (mapped), depending, for example, on a type and a signal amount of each of types of control signals (PDCCH, EPDCCH, PUCCH, EPUCCH, CSI-RS, SRS, etc.) communicated with the user equipment 10. Furthermore, the resource configuration determination unit 403 stores the determined resource block configuration in a memory. The resource block configuration determination unit 403 may periodically determine a resource block configuration; or may detect a variation in a signal amount of each of the types of control signals communicated with the user equipment 10, and, upon detecting that the variation in the signal amount exceeds a predetermined threshold value, the resource block configuration may be determined (updated).

The configuration report signal generator 404 generates a resource block configuration report signal to be reported to the user equipment 10, based on the resource block configuration determined by the resource block configuration determination unit 403. The configuration report signal generator 404 transmits the generated resource block configuration report signal to the signal transmitter 402.

The guard interval determination unit 411 determines (finds) a location of a guard subcarrier that is set in a resource block, in which the uplink control signal received by the signal receiver 401 is included (mapped), based on the resource block configuration stored in the resource block configuration determination unit 403; and controls the signal receiver 401, so that, when the signal receiver 401 demodulates a radio signal, the radio signal is correctly demodulated.

The guard interval addition unit 412 sets (adds) a guard subcarrier to a resource block in which a downlink control signal is included (mapped) based on the guard subcarrier configuration stored in the resource block configuration determination unit 403.

The second embodiment is described above. In the radio communication system according to the second embodiment, a configuration ratio between resource blocks allocated to an uplink control signal and resource blocks allocated to a downlink control signal can be efficiently changed for a communication scheme based on a full duplex scheme, depending on a type and a signal amount of each of various types of control signals. Additionally, in this manner, it is allowed to set a guard subcarrier to a resource block allocated to an uplink/downlink control signal, so that the radio communication system according to the embodiment can eliminate the effect of a frequency shift etc., caused by the Doppler effect, and can ensure reception quality of the control signal.

<Hardware Configuration>

For each of the functional configurations of the user equipment 10 and the base station 20 described above in the first embodiment and the second embodiment, the entire configuration may be implemented by a hardware circuit (e.g., one or more IC chips); or a part of the configuration may be implemented by a hardware circuit, and the other part may be implemented by a CPU and a program.

(User Equipment)

Figure 28:
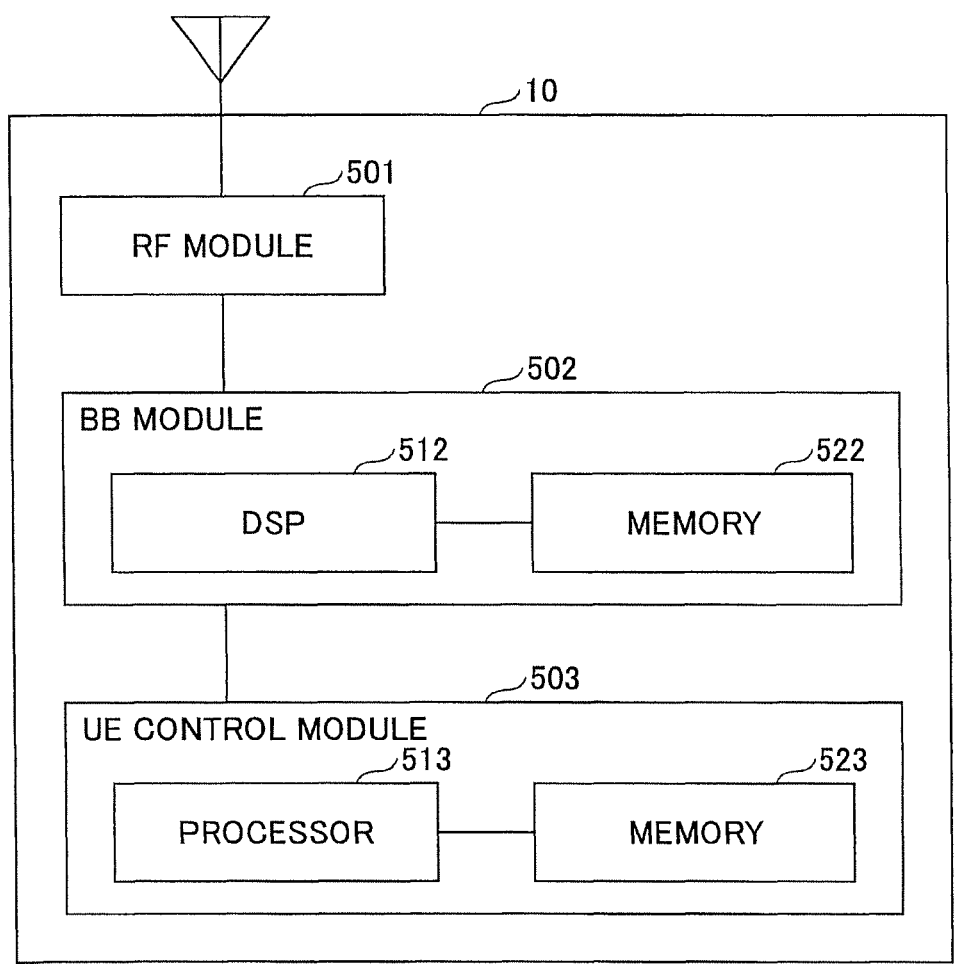
FIG. 28 is a diagram illustrating an example of a hardware configuration of the user equipment according to the embodiments.

FIG. 28 is a diagram illustrating an example of a hardware configuration of the user equipment according to the embodiments. FIG. 28 shows a configuration closer to an implementation example compared to those of FIG. 20 and FIG. 26. As illustrated in FIG. 28, the user equipment 10 includes an RF (Radio Frequency) module 501 that executes a process related to a radio signal; a BB (Base Band) processing module 502 that performs baseband signal processing; and a UE control module 503 that performs a process of a higher layer, etc.

The RF module 501 generates a radio signal to be transmitted from an antenna by executing a D/A (Digital-to-Analog) conversion; modulation; a frequency conversion; power amplification, and so forth to a digital baseband signal received from the BB processing module 502. Additionally, a digital baseband signal is generated by applying a frequency conversion, an A/D (Analog to Digital) conversion, demodulation, and so forth to a received radio signal; and it is passed to the BB processing module 502. The RF module 501 includes, for example, a part of the signal receiver 101 and a part of the signal transmitter 102, which are illustrated in FIG. 20; and a part of the signal receiver 301 and a part of the signal transmitter 302, which are illustrated in FIG. 26.

The BB processing module 502 executes a process of mutually converting an IP packet and a digital baseband signal. A DSP (Digital Signal Processor) 512 is a processor that executes signal processing in the BB processing module 502. A memory 522 is used as a work area of the DSP 512. The BB processing module 502 includes, for example, a part of the signal receiver 101, a part of the signal transmitter 102, and the subframe configuration storage unit 103, which are illustrated in FIG. 20; and a part of the signal receiver 301, a part of the signal transmitter 302, and the resource block configuration storage unit 303, which are illustrated in FIG. 26.

The UE control module 503 executes protocol processing of an IP layer, processing of various applications, and so forth. A processor 513 is the processor that executes a process to be executed by the UE control module 503. A memory 523 is used as a work area of the processor 513.

(Base Station)

Figure 29:
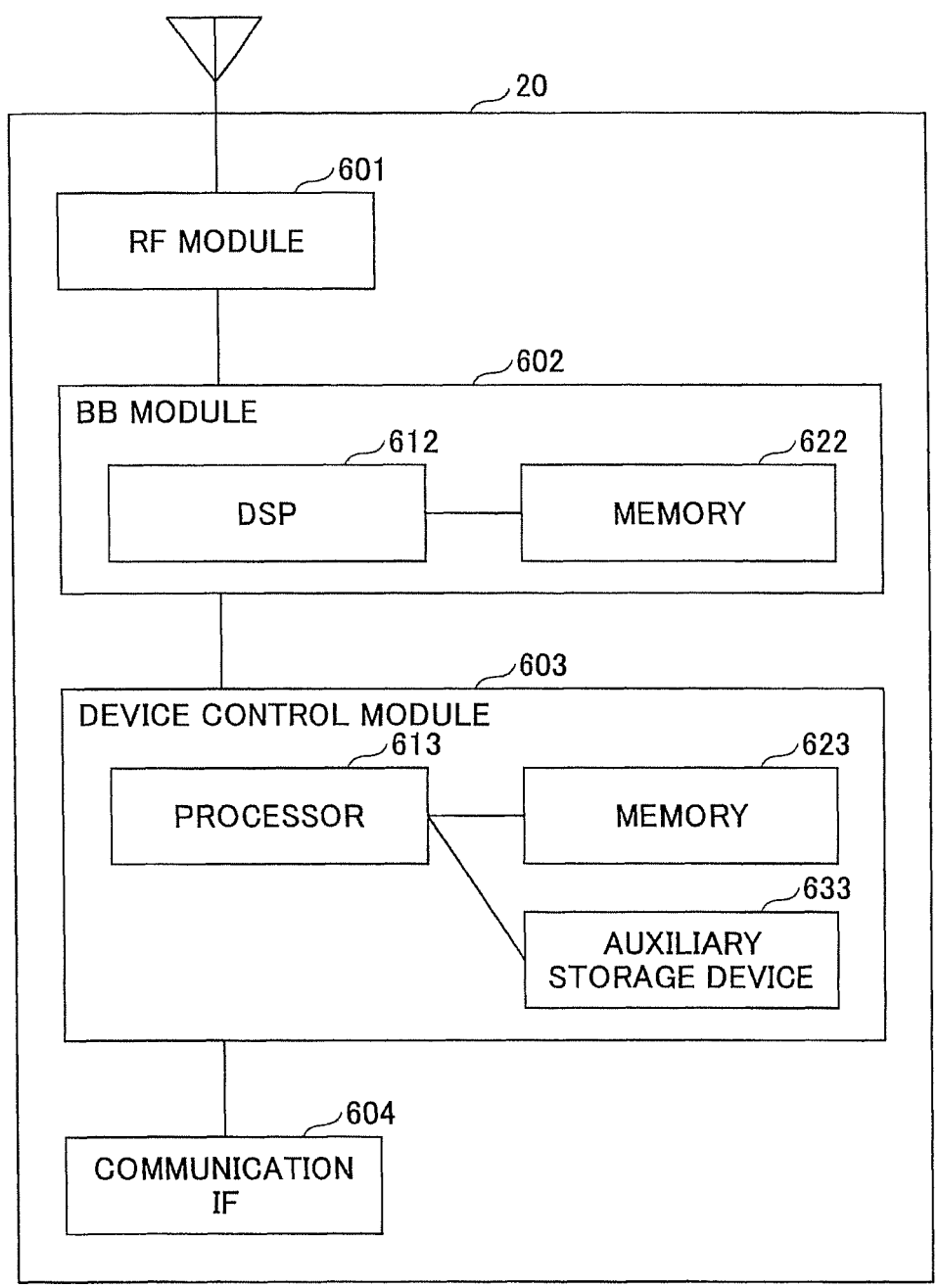
FIG. 29 is a diagram illustrating an example of a hardware configuration of the base station according to the embodiments.

FIG. 29 is a diagram illustrating an example of a hardware configuration of the base station according to the embodiments. FIG. 29 illustrates a configuration that is closer to an implementation example, compared to FIG. 21 and FIG. 27. As illustrated in FIG. 29, the base station 20 includes an RF module 601 that executes a process related to a radio signal; a BB processing module 602 that executes baseband signal processing; a device control module 603 that executes a process of, for example, a higher layer; and a communication IF 604 that is an interface for connecting to a network.

The RF module 601 generates a radio signal to be transmitted from an antenna by executing, for example, a D/A conversion; modulation; a frequency conversion; power amplification; and so forth to a digital baseband signal received from the BB processing module 602. Additionally, a digital baseband signal is generated by applying a frequency conversion, an A/D conversion, demodulation, and so forth to a received radio signal; and it is passed to the BB processing module 602. The RF module 601 includes, for example, a part of the signal receiver 201 and a part of a signal transmitter 202, which are illustrated in FIG. 21; and a part of the signal receiver 401 and a part of the signal transmitter 402, which are illustrated in FIG. 27.

The BB processing module 602 executes a process of mutually converting an IP packet and a digital baseband signal. A DSP 612 is a processor that executes signal processing in the BB processing module 602. A memory 622 is used as a work area of the DSP 612. The BB processing module 602 includes, for example, a part of the signal receiver 201, a part of the signal transmitter 202, a part of the subframe configuration determination unit 203, and a part of the configuration report signal generator 204, which are illustrated in FIG. 21; and a part of the signal receiver 401, a part of the signal transmitter 402, a part of the resource block configuration determination unit 403, and a part of the configuration report signal generator 404, which are illustrated in FIG. 27.

The device control module 603 executes protocol processing of an IP layer; OAM (Operation and Maintenance) processing, and so forth. A processor 613 is the processor that executes a process to be executed by the device control module 603. A memory 623 is used as a work area of the processor 613. An auxiliary storage device 633 is, for example, a HDD; and stores various types of setting information and so forth, which are for operating the base station 20 itself. The device control module 603 includes, for example, a part of the subframe configuration determination unit 203 and a part of the configuration report signal generator 204, which are illustrated in FIG. 21; and a part of the resource block configuration determination unit 403 and a part of the configuration report signal generator 404.

<Effect>

As described above, according to the embodiments, there is provided user equipment for communicating with a base station in a radio communication system supporting communication based on a TDD scheme, the user equipment including a transmitter that transmits an uplink signal while setting a guard time in the uplink signal based on a report signal indicating a structure for each subframe, the report signal being transmitted from the base station; a receiver that receives a downlink signal from the base station; and an identification unit that identifies, based on the report signal, a position of a guard time that is set in the downlink signal received by the receiver.

With this user equipment 10, a technique can be provided that is for dynamically controlling the guard time.

Furthermore, the report signal may be a signal indicating whether a predetermined subframe is a subframe to be allocated to an uplink signal or a subframe to be allocated to a downlink signal; presence or absence of the guard time; and the position of the guard time. Furthermore, the report signal may be a signal indicating, in a predetermined subframe, an interval to be allocated to an uplink signal; an interval to be allocated to a downlink signal; and the position of the guard time. As a result, the base station 20 can report, to the user equipment 10, various forms of subframe structures and settings of guard times. Consequently, for the radio communication system according to the embodiment, enhancement, etc., of communication efficiency can be attempted.

Furthermore, the guard time in the predetermined subframe may include a cyclic prefix; and the transmitter may set the cyclic prefix included in the guard time to a non-transmission state. As a result, the user equipment can implement various communication methods depending, for example, on types of control signals.

Furthermore, according to the embodiments, there is provided a base station for communicating with user equipment in a radio communication system that supports communication based on a TDD scheme, the base station including a generator that generates a report signal indicating a structure for each subframe; a report unit that reports the structure for each subframe by transmitting the report signal to the user equipment; a transmitter that transmits a downlink signal while setting a guard time in the downlink signal based on the report signal; a receiver that receives an uplink signal from the user equipment; and an identification unit that identifies a position of a guard time that is set in the uplink signal received by the receiver based on the structure for each subframe.

With this base station 20, a technique can be provided that is for dynamically controlling the guard time.

Furthermore, according to the embodiments, there is provided user equipment for communicating with a base station in a radio communication system that supports communication based on a full duplex scheme, the user equipment including a receiver that receives a report signal indicating a structure for each resource block in a predetermined subframe, the report signal being transmitted from the base station; and an identification unit that identifies, based on the report signal, whether each resource block is a resource block to be allocated to an uplink control signal or a resource block to be allocated to a downlink control signal, and identifies a position of a guard subcarrier included in each resource block, wherein, in the resource block allocated to the downlink control signal, the resource block being identified by the identification unit, the receiver receives data included in a subcarrier other than the guard subcarrier.

With this user equipment 10, a technique can be provided that allows a guard subcarrier to be set.

Furthermore, the receiver may receive the report signal by executing a demodulation process based on an identification signal indicating whether a guard subcarrier is included in a resource block to which the report signal is to be mapped, or whether a guard time is included in the resource block to which the report signal is to be mapped. Furthermore, the identification signal may be mapped onto one or more OFDM symbols at a start of the resource block to which the report signal is to be mapped. As a consequence, the user equipment 10 can efficiently receive (obtain) a resource block configuration report signal indicating a configuration of a resource block.

Furthermore, the receiver may store, in advance, a plurality of signal formats corresponding to the resource block to which the report signal is to be mapped; and may receive the report signal by executing a demodulation process for the resource block onto which the report signal is mapped, in accordance with each of the plurality of signal formats. As a consequence, in the radio communication system according to the embodiment, an amount of signals to be transmitted from the base station 20 to the user equipment 10 can be reduced.

Furthermore, according to the embodiments, there is provided a base station for communicating with user equipment in a radio communication system that supports communication based on a full duplex scheme, the base station including a generator that generates a report signal indicating a structure for each resource block in a predetermined subframe; a first transmitter that transmits the report signal to the user equipment; and a second transmitter that transmits data while setting a guard subcarrier in a resource block allocated to a downlink control signal, based on the structure for each resource block.

With this base station 20, a technique can be provided that allows a guard subcarrier to be set.

Furthermore, the "unit" in the configuration of each of the above-described devices may be replaced with "section," "circuit," "device," and so forth.

<Supplement to the Embodiments>

The first embodiment and the second embodiment are described above; however, a radio communication system according to a combination of these embodiments may be provided. For example, in the radio communication system according to the second embodiment, a resource block configuration in a plurality of contiguous subframes may be determined, and the uplink and the downlink may be dynamically switched for each subframe. Furthermore, in this case, the position of the guard time (guard time) may be switched in each subframe.

The embodiments of the present invention are described above; however the disclosed invention is not limited to the embodiments, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional configuration diagrams may not necessarily correspond to a boundary of a physical component. An operation by a plurality of functional units may be physically executed by a single component, or an operation of a single functional unit may be physically executed by a plurality of components. For the convenience of description, the user equipment and the base station are described by using the functional block diagrams; however, such devices may be implemented in hardware, software, or combinations thereof. Each of the software to be operated by the processor included in the user equipment in accordance with the embodiments of the present invention, and the software to be operated by the processor included in the base station in accordance with the embodiments of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth. The present invention is not limited to the above-described embodiments, and various variation examples, modified examples, alternative examples, replaced examples, and so forth are included in the present invention without departing from the sprit of the present invention.

Note that in the embodiments, the subframe configuration report signal or the resource block report signal is an example of a report signal. Furthermore, signal transmitters 102, 202, 302, and 402 are examples of a transmitter. Furthermore, signal receivers 101, 201, 301, and 401 are examples of a receiver. Furthermore, the guard time determination units 111 and 211, and the guard interval determination units 311 and 411 are examples of an identification unit.

LIST OF REFERENCE SYMBOLS

10: user equipment
20: base station

101: signal receiver
102: signal transmitter
103: subframe configuration storage unit
111: guard time determination unit
112: guard time addition unit
201: signal receiver
202: signal transmitter
203: subframe configuration determination unit
204: configuration report signal generator
211: guard time determination unit
212: guard time addition unit
301: signal receiver
302: signal transmitter
303: resource block configuration storage unit
311: guard interval determination unit
312: guard interval addition unit
401: signal receiver
402: signal transmitter
403: resource block configuration determination unit
404: configuration report signal generator
411: guard interval determination unit
412: guard interval addition unit
501: RF module
502: BB processing module
503: UE control module
601: RF module
602: BB processing module
603: device control module
604: communication IF

The invention claimed is:

1. A user equipment comprising:
a receiver that receives first information and second information, wherein the first information relates to a configuration indicating whether a predetermined interval of 14 symbols is assigned to an uplink signal or a downlink signal and the second information relates to a configuration of a position of a guard time in the predetermined interval of the 14 symbols; and
a transmitter that transmits the uplink signal while setting the guard time in the uplink signal based on the first information and the second information,
wherein the interval assigned to the downlink signal, the interval assigned to the uplink signal, and the position of the guard time are configured in units of Orthogonal Frequency-Division Multiplexing (OFDM) symbols, and
wherein the second information indicates one of a plurality of configurations for configuring different guard times.

2. The user equipment according to claim 1, wherein the second information indicates presence or absence of the guard time.

3. The user equipment according to claim 1, wherein the receiver identifies the position of the guard time set in the downlink signal based on the first information and the second information and receives the downlink signal.

4. The user equipment according to claim 1, wherein the receiver receives the second information through a downlink control channel.

5. A base station comprising:
a transmitter that transmits first information and second information, wherein the first information relates to a configuration indicating whether a predetermined interval of 14 symbols is assigned to an uplink signal or a downlink signal and the second information relates to a configuration of a position of a guard time in the predetermined interval of the 14 symbols; and
a receiver that identifies the position of the guard time set in the uplink signal based on the first information and the second information and that receives the uplink signal,
wherein the transmitter transmits the downlink signal while setting the guard time in the downlink signal based on the first information and the second information,
wherein the interval assigned to the downlink signal, the interval assigned to the uplink signal, and the position of the guard time are configured in units of Orthogonal Frequency-Division Multiplexing (OFDM) symbols, and
wherein the second information indicates one of a plurality of configurations for configuring different guard times.

6. The user equipment according to claim 2, wherein the receiver identifies the position of the guard time set in the downlink signal based on the first information and the second information and receives the downlink signal.

7. A communication method by user equipment, the method comprising:
receiving first information and second information, wherein the first information relates to a configuration indicating whether a predetermined interval of 14 symbols is assigned to an uplink signal or a downlink signal and the second information relates to a configuration of a position of a guard time in the predetermined interval of the 14 symbols; and
transmitting an uplink signal while setting a guard time in the uplink signal based on the first information and the second information,
wherein the receiving identifies the position of the guard time that is set in the downlink signal based on the first information and the second information, and the receiving receives the downlink signal,
wherein the interval assigned to the downlink signal, the interval assigned to the uplink signal, and the position of the guard time are configured in units of Orthogonal Frequency-Division Multiplexing (OFDM) symbols, and
wherein the second information indicates one of a plurality of configurations for configuring different guard times.

* * * * *